United States Patent
Djavanroodi et al.

(10) Patent No.: US 12,510,516 B1
(45) Date of Patent: Dec. 30, 2025

(54) MODULAR PIPE INSPECTION ROBOT AND METHOD FOR INSPECTING AN EXTERNAL SURFACE OF A PIPE

(71) Applicant: PRINCE MOHAMMAD BIN FAHD UNIVERSITY, Dhahran (SA)

(72) Inventors: Faramarz Djavanroodi, Dhahran (SA); Abdul Aziz Afzal, Dhahran (SA); Raghad Hanbazazah, Dhahran (SA); Elaf Suwaid, Dhahran (SA); Munirah Alhamed, Dhahran (SA); Hatan Alessa, Dhahran (SA); Aseel Alshammari, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/331,794

(22) Filed: Sep. 17, 2025

(51) Int. Cl.
*G01N 29/265* (2006.01)
*G01B 17/02* (2006.01)
*G01N 29/02* (2006.01)

(52) U.S. Cl.
CPC ........... *G01N 29/265* (2013.01); *G01B 17/02* (2013.01); *G01N 29/02* (2013.01); *G01N 2291/2634* (2013.01)

(58) Field of Classification Search
CPC ............... G01N 29/265; G01N 29/02; G01N 2291/2634; G01B 17/02
See application file for complete search history.

(56) References Cited

U.S. PATENT DOCUMENTS

| 12,258,109 B1 | 3/2025 | Seeley |
| 2024/0068951 A1* | 2/2024 | Wang ............ G01S 13/885 |

FOREIGN PATENT DOCUMENTS

| CN | 210950424 U | 7/2020 |
| CN | 221704791 U | 9/2024 |
| JP | 1-266091 A | 10/1989 |
| WO | WO-2024254593 A2 * | 12/2024 ........... G06V 20/588 |

* cited by examiner

*Primary Examiner* — David Z Huang
(74) *Attorney, Agent, or Firm* — Oblon, McClelland, Maier & Neustadt, L.L.P.

(57) ABSTRACT

A modular pipe inspection robot for operation on an external surface of a pipe comprises a spherical sensor unit having a hemispherical upper portion and a hemispherical lower portion, and a rhombohedral body with wheel well cutouts and an angled top surface with a hemispherical opening to support the spherical sensor unit. Magnet wheels located beneath the rhombohedral body are rotated by geared motors. A power supply is located in the hemispherical lower portion, with sensors mounted within the spherical sensor unit. A microcontroller positioned within the spherical sensor unit is operatively connected to the geared motors, power supply and sensors. A thermal management system including cooling fins integrated into the rhombohedral body provides heat dissipation during operation.

20 Claims, 12 Drawing Sheets

MODULAR PIPE INSPECTION ROBOT AND METHOD FOR INSPECTING AN EXTERNAL SURFACE OF A PIPE

BACKGROUND

Technical Field

The present disclosure is directed to robotics and automated inspection systems, and more particularly to a modular pipe inspection robot for operation on an external surface of a pipe with thermal management capabilities through integrated cooling fin structures.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Pipeline inspection processes employ automated systems to evaluate the structural condition and operational integrity of pipeline infrastructure. Current pipeline inspection methodologies typically utilize internal robotic platforms that traverse through interior pipe sections to identify structural defects, material degradation, or operational anomalies. These conventional systems generally employ wheeled locomotion mechanisms that move along internal pipe surfaces while carrying arrays of measurement sensors including ultrasonic thickness gauges, visual inspection cameras, and environmental monitoring equipment. The inspection data collected by these systems may include pipe wall thickness measurements, corrosion pattern identification, structural anomaly detection, and overall pipeline condition assessment for maintenance planning and safety evaluation.

Problems associated with conventional pipeline inspection systems include thermal management limitations during extended operational periods, particularly when electronic components generate heat within confined operational spaces. The enclosed design architecture of traditional robotic inspection platforms creates thermal accumulation that leads to component degradation, reduced operational duration, and compromised measurement accuracy during extended inspection cycles. Additionally, conventional systems typically lack modular component architectures, necessitating complete system replacement or extensive disassembly procedures when individual components require maintenance operations, performance upgrades, or reconfiguration for different inspection applications. The fixed design structure of existing systems also restricts their operational adaptability to varying pipeline configurations and specialized inspection requirements.

CN221704791 describes a spherical robot walking mechanism designed for industrial pipeline leakage detection from within the pipe. The robot features a spherical shell with a driving chamber and utilizes a level detector that signals pneumatic cylinders to extend rods against the pipe walls to maintain balance when the robot tilts. The mechanism incorporates heat dissipation gaps to extend component life and uses a dual-axis motor connected to driving wheels with gear teeth for traction inside the pipeline. However, this reference does not describe an integrated system for external pipeline inspection that combines a reconfigurable modular sensor unit with a chassis featuring a dedicated thermal management system.

U.S. Ser. No. 12/258,109B1 describes methods for managing buoyancy, stability, and thermal properties in a field-configurable underwater vehicle. This is achieved through the use of passive, sealed bladders integrated within hull of the vehicle, which can be filled with fluids of varying densities to adjust center of mass and thermal characteristics of the vehicle. The system is designed for underwater operation and focuses on stability and thermal control through fluid-filled bladders rather than locomotion on a dry, external surface. However, this reference does not describe an integrated system for external pipeline inspection that combines a reconfigurable modular sensor unit with a chassis featuring a dedicated thermal management system.

CN210950424 describes an intelligent pipeline robot designed for clearing blockages in small drainage pipes. The robot has a spherical shell and features a dredging component with triangular hooks that can rotate to either break up or extract materials causing a blockage inside the pipe. The robot uses a sonar detector to identify obstacles and navigate within the confined space of the drainage pipe. However, this reference does not describe an integrated system for external pipeline inspection that combines a reconfigurable modular sensor unit with a chassis featuring a dedicated thermal management system.

JPH01266091A describes an underwater working robot designed for operation inside of iron pipelines. For stability, the robot uses electromagnetic attraction pads or suction cups on retractable arms that adhere to the pipe walls at inspection points, allowing the main body to rotate relative to these fixed arms. This design is focused on stationary inspection from within a fluid-filled pipeline and does not address thermal management or modularity for external surface navigation. However, this reference does not describe an integrated system for external pipeline inspection that combines a reconfigurable modular sensor unit with a chassis featuring a dedicated thermal management system.

Each of the aforementioned references suffers from one or more drawbacks hindering their adoption, such as being designed for internal rather than external pipeline inspection, lacking a modular architecture for interchangeable sensor payloads, or failing to incorporate a thermal management system specifically designed for dissipating heat from a mobile chassis operating on an external surface. The mechanisms for stability and locomotion in these references, such as pneumatic arms or buoyancy control, are not suited for navigating the exterior of a pipeline, which requires consistent adhesion and traction. Accordingly, it is one object of the present disclosure to provide an inspection robot which is specifically designed for stable and reliable operation on the external surface of a pipe, featuring an easily interchangeable sensor unit and an integrated thermal management system to ensure prolonged operational endurance.

SUMMARY

In an exemplary embodiment, a modular pipe inspection robot for operation on an external surface of a pipe comprises a spherical sensor unit having a hemispherical upper portion and a hemispherical lower portion, a rhombohedral body including a first side, a second side opposite the first side, a rear end, a front end, wheel well cutouts on the first side and the second side and an angled top surface equipped with a hemispherical opening configured to support the spherical sensor unit, a plurality of magnet wheels located beneath the rhombohedral body, a plurality of geared motors configured to rotate the plurality of magnetic wheels, a power supply located in the hemispherical lower portion, a plurality of sensors mounted within the spherical sensor unit, a microcontroller positioned within the spherical sensor unit, wherein the microcontroller is operatively connected to the plurality of geared motors, the power supply and the plurality of sensors, and a thermal management system comprising a plurality of cooling fins integrated into the rhombohedral body.

In another exemplary embodiment, a method for inspecting an external surface of a pipe with a modular pipe inspection robot comprises inserting a power supply into a hemispherical lower portion of a spherical sensor unit, inserting a circuit board including a microcontroller, a data storage unit and a wireless communication unit near a top edge of the hemispherical lower portion of the spherical sensor unit, attaching a plurality of sensors into a hemispherical upper portion of the spherical sensor unit, connecting the hemispherical upper portion of the spherical sensor unit to the hemispherical lower portion by a band which surrounds a lower edge of the hemispherical upper portion and an upper edge of the hemispherical lower portion, inserting a spherical sensor unit holder into a cutout in the rhombohedral body, inserting the spherical sensor unit into the spherical sensor unit holder, locking, by a spherical sensor unit lock connected to the spherical sensor unit holder, the spherical sensor unit into the rhombohedral body, positioning the modular inspection robot on the external surface of the pipe, securing the robot to the pipe by engaging a plurality of magnet wheels of the modular pipe inspection robot with the external surface, generating, by a microcontroller located within the spherical sensor unit, a plurality of drive signals configured to actuate a plurality of geared motors, wherein each of the plurality of geared motors is connected to an axle of a respective magnet wheel, actuating, by the drive signals, the plurality of geared motors to rotate the plurality of magnet wheels and navigate along the external surface, actuating, by the microcontroller, the plurality of sensors to perform measurements and generate measurements, collecting, by the data storage unit, the sensor measurement signals from the plurality of sensors while navigating along the external surface, storing the sensor measurement signals in the data storage unit, transmitting, by a wireless communication unit operatively connected to the microcontroller, the sensor measurement signals collected by the data storage unit to an external receiver, and dissipating heat generated during operation through a plurality of cooling fins integrated into the rhombohedral body.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
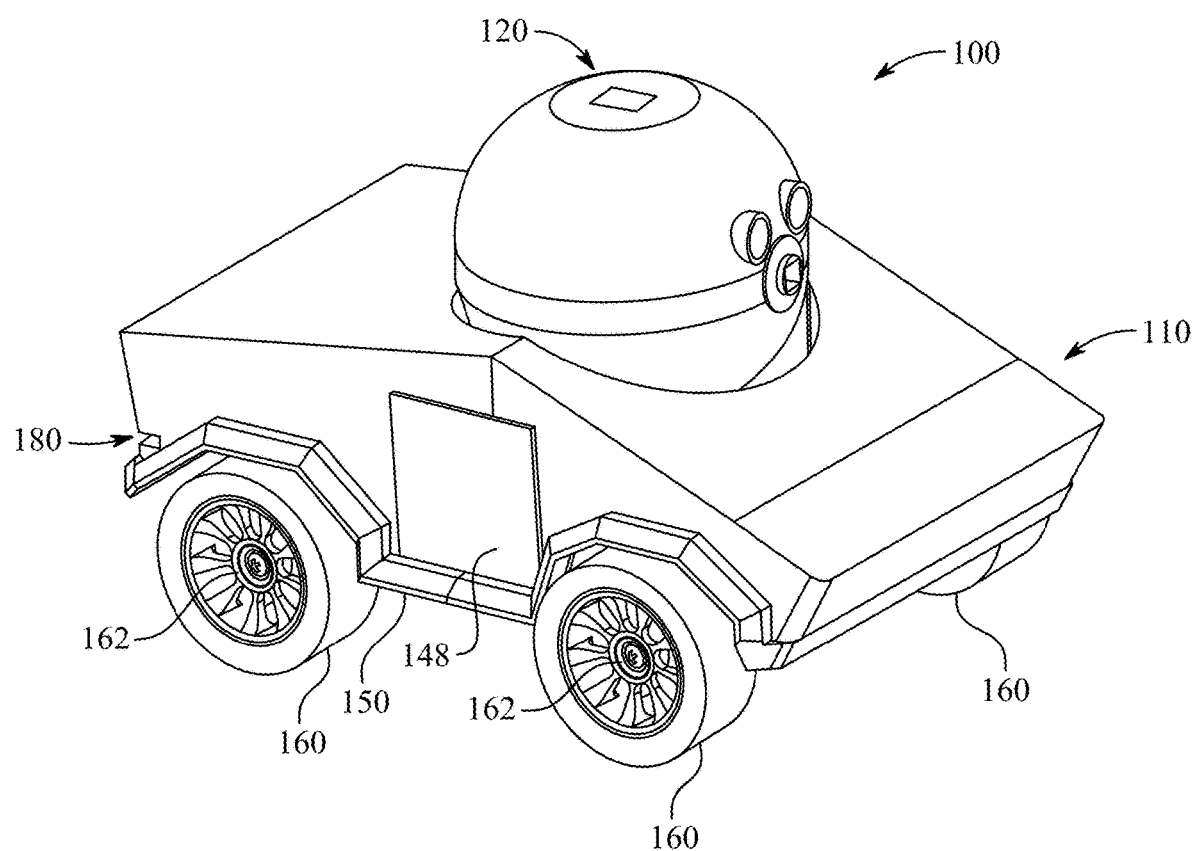
FIG. 1A is an exemplary assembled perspective view of a modular pipe inspection robot showing the complete system in operational configuration, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a modular pipe inspection robot for operation on an external surface of a pipe and a method for inspecting an external surface of a pipe with the modular pipe inspection robot. The modular pipe inspection robot is configured for navigating and performing inspection tasks on the external surface of pipelines. The modular pipe inspection robot integrates a locomotion platform designed for adhesion to pipe surfaces with a detachable sensor unit that houses control electronics and a customizable sensor array, addressing the need for operational flexibility. Furthermore, the modular pipe inspection robot incorporates a thermal management system to effectively dissipate heat generated by its electronic components, thereby enhancing performance and reliability during extended use in environments for pipe inspection.

Figure 1B:
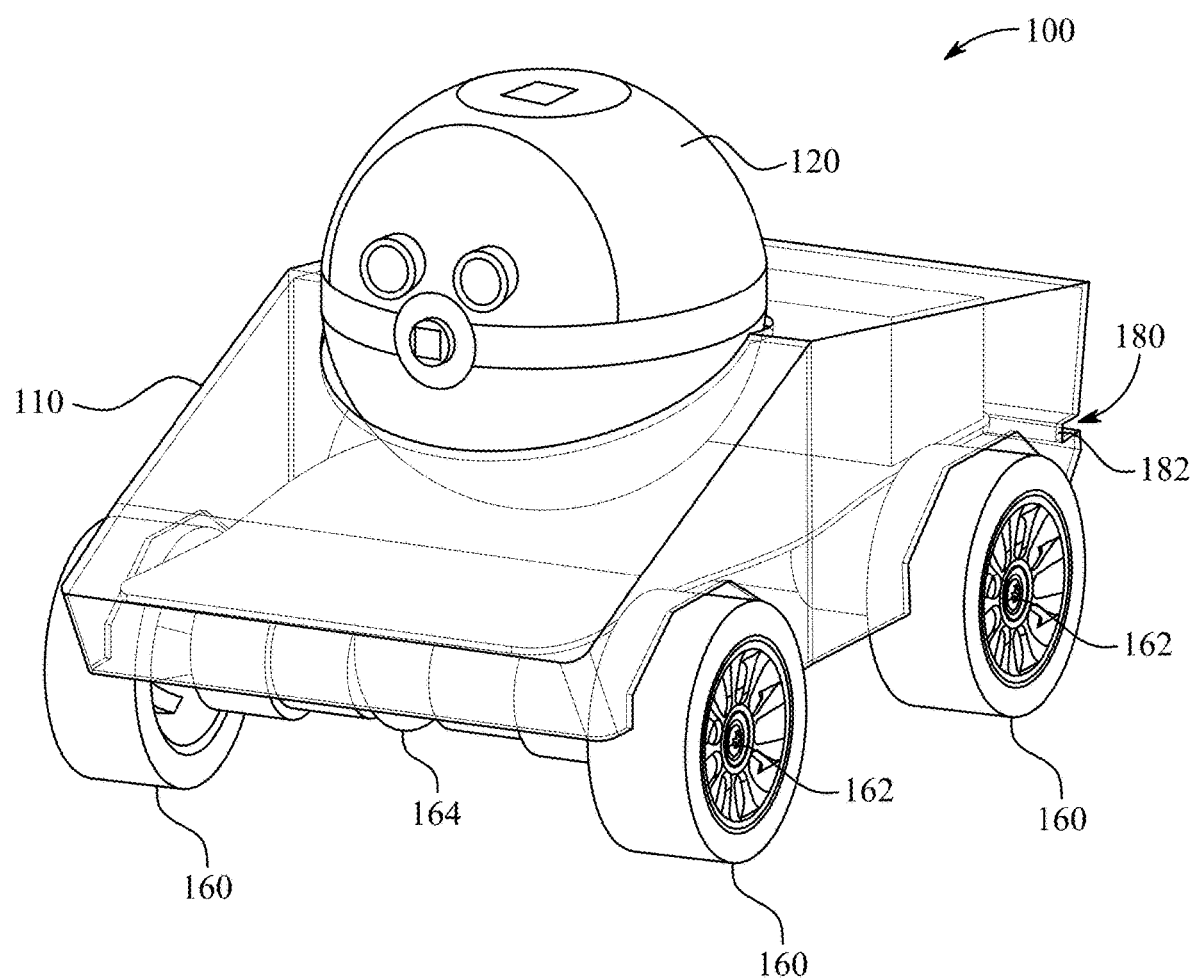
FIG. 1B is an exemplary wireframe perspective view of the modular pipe inspection robot, according to certain embodiments.
Figure 1C:
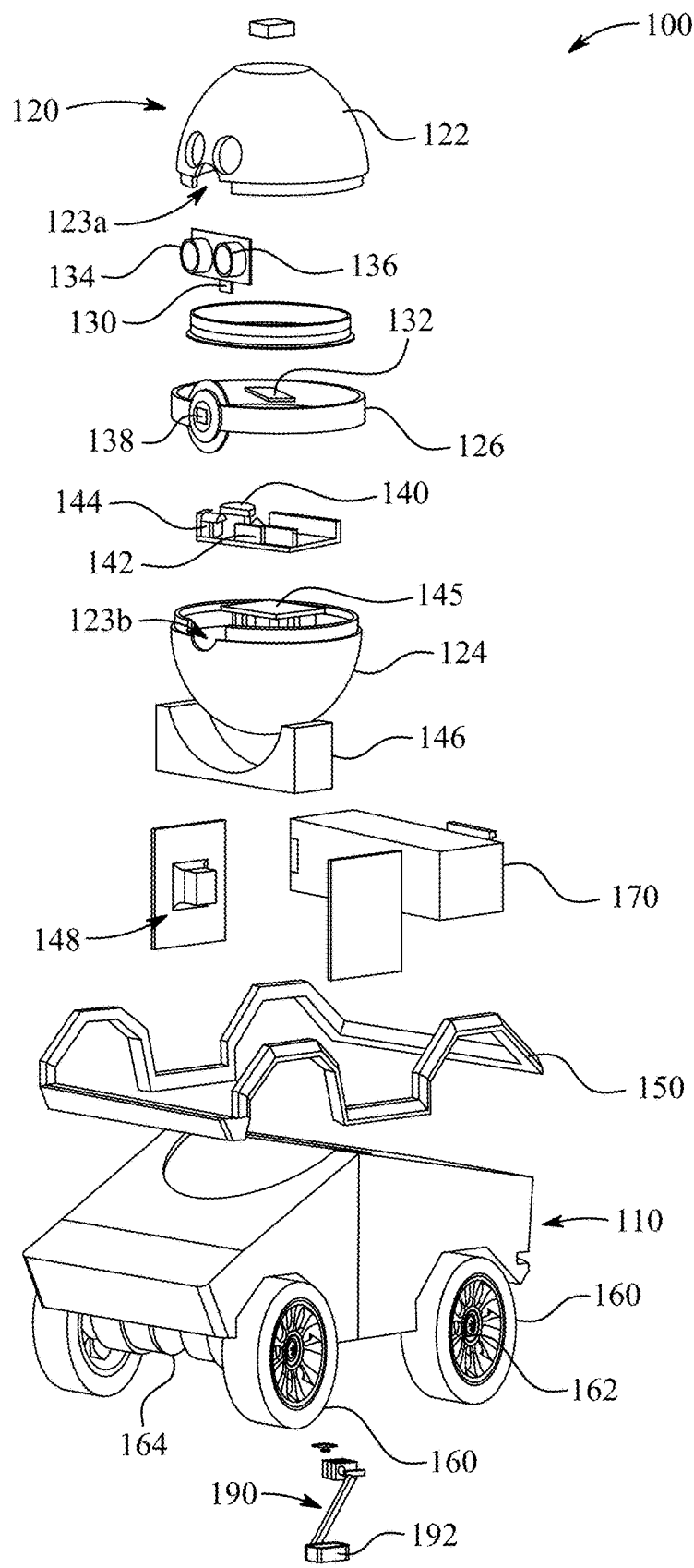
FIG. 1C is an exemplary exploded perspective view of the modular pipe inspection robot illustrating major individual components thereof, according to certain embodiments.

Referring to FIGS. 1A, 1B, and 1C in combination, illustrate a modular pipe inspection robot (as represented by reference numeral 100) for operation on an external surface of a pipe. Herein, FIG. 1A shows an assembled perspective view of the modular pipe inspection robot 100 in its operational configuration, FIG. 1B shows a wireframe perspective view of the modular pipe inspection robot 100, and FIG. 1C shows an exploded perspective view of the modular pipe inspection robot 100 illustrating its primary sub-assemblies and their relationship to one another.

The modular pipe inspection robot 100 of the present disclosure is designed for autonomous or semi-autonomous operation on an external surface of a pipe, providing a mobile platform for various non-destructive inspection tasks. The modular pipe inspection robot 100 provides automated inspection capabilities for pipeline infrastructure through magnetic adhesion to external pipe surfaces combined with modular sensor replacement functionality. Additionally, the modular pipe inspection robot 100 enables rapid deployment and component reconfiguration for various inspection tasks without requiring complete system disassembly procedures.

As illustrated in FIGS. 1A-1C in combination, the modular pipe inspection robot 100 comprises a rhombohedral body 110, a spherical sensor unit 120, a plurality of magnet wheels 160, and a frame unit 150. The modular construction of the modular pipe inspection robot 100 is centered on the separable rhombohedral body 110 and the spherical sensor unit 120, which facilitates easy customization and maintenance, allowing different sensor units to be interchanged. The accompanied drawings illustrate the relationship between the primary structural components, including the rhombohedral body 110 that serves as the main chassis, and the spherical sensor unit 120 that houses measurement instruments and control electronics. The modular pipe inspection robot 100 in its assembled configuration presents a low-profile design suitable for navigation along external pipe surfaces while maintaining adequate ground clearance. Further, the exploded view of FIG. 1C depicts how the spherical sensor unit 120 separates from the rhombohedral body 110, which enables rapid sensor replacement and maintenance without requiring complete system disassembly. The exploded configuration also shows the relationship between structural components and the accessibility of internal components for maintenance.

Figure 2:
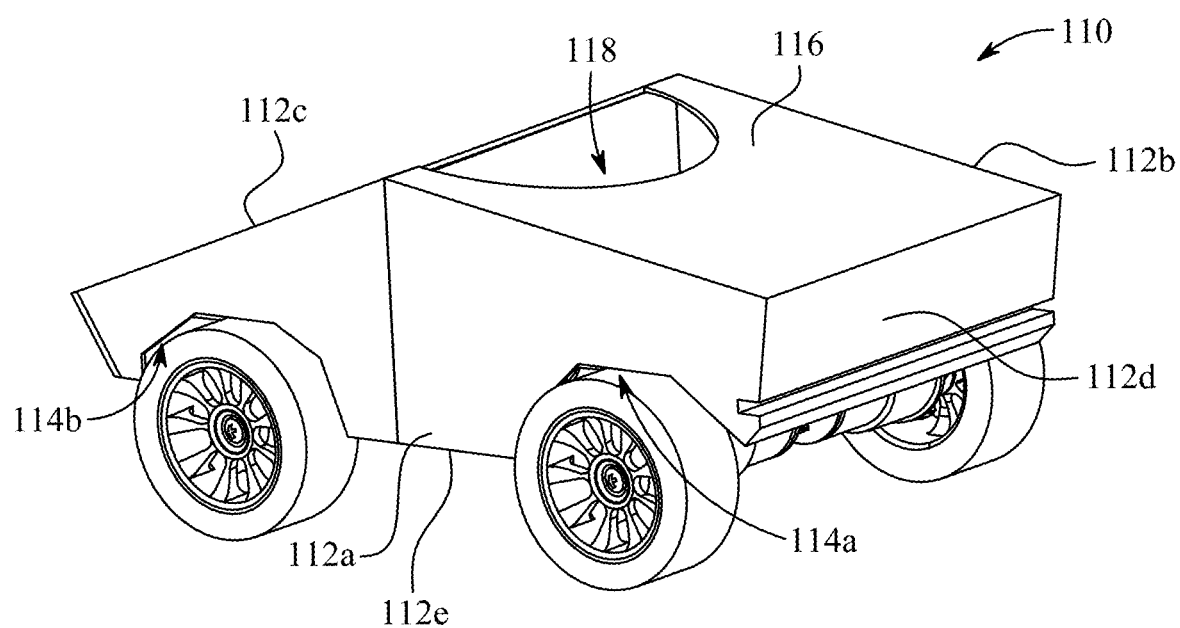
FIG. 2 is an exemplary perspective view of a rhombohedral body of the modular pipe inspection robot, according to certain embodiments.

Referring to FIG. 2, illustrated is the rhombohedral body 110 in isolation showing its structural configuration and integrated thermal management features. The rhombohedral body 110 serves as the primary structural chassis for the modular pipe inspection robot 100 and provides mechanical support for propulsion components while housing thermal management systems. The rhombohedral body 110 includes a first side 112a, a second side 112b opposite the first side 112a, a rear end 112c, a front end 112d, and a lower surface 112e, wheel well cutouts 114a and 114b on the first side 112a and the second side 112b respectively, and an angled top surface 116 equipped with a hemispherical opening 118 configured to support the spherical sensor unit 120. The geometric configuration of the rhombohedral body 110 optimizes both structural integrity and thermal dissipation performance during inspection operations through strategic placement of heat transfer elements.

The first side 112a and the second side 112b of the rhombohedral body 110 provide lateral structural boundaries that define the overall width and stability characteristics of the modular pipe inspection robot 100. The wheel well cutouts 114a, 114b on the first side 112a and the second side 112b create recessed areas that accommodate magnetic wheel assemblies while maintaining aerodynamic flow characteristics during surface navigation operations. The geometric configuration of the first side 112a and the second side 112b also provides mounting surfaces for external components such as sensor mounting brackets, auxiliary equipment interfaces, or protective elements. Furthermore, the first side 112a and the second side 112b incorporate structural reinforcement features that distribute mechanical loads from magnetic wheel assemblies throughout the rhombohedral body 110 structure to prevent stress concentrations and structural failure.

The rear end 112c and the front end 112d of the rhombohedral body 110 define the longitudinal boundaries and establish the overall length characteristics of the modular pipe inspection robot 100. The rear end 112c includes mounting provisions for power management components and external interface connections such as charging ports or communication interfaces that enable operational support without system disassembly. The front end 112d incorporates sensor mounting features and provides aerodynamic shaping that reduces air resistance during forward motion along pipe surfaces while maintaining structural protection for internal components. The geometric relationship between the rear end 112c and the front end 112d creates a balanced mass distribution that maintains stable magnetic adhesion while enabling efficient propulsion during navigation operations. Additionally, both the rear end 112c and the front end 112d include structural features that protect internal components from environmental contamination while maintaining accessibility for maintenance procedures.

The angled top surface 116, equipped with the hemispherical opening 118, provides the primary mounting interface between the rhombohedral body 110 and the spherical sensor unit 120. The angled configuration of the angled top surface 116 creates optimal positioning for sensor field-of-view requirements while maintaining mechanical stability during inspection operations and thermal management efficiency. The hemispherical opening 118 includes defined surfaces that ensure accurate alignment and secure coupling with the spherical sensor unit 120 while maintaining environmental sealing integrity. Furthermore, the angled top surface 116 incorporates locking mechanisms and electrical connections that facilitate rapid installation and removal of the spherical sensor unit 120 for maintenance or sensor reconfiguration operations.

In an aspect of the present disclosure, the rhombohedral body 110 comprises a 3D-printed aluminum chassis. The 3D-printed aluminum construction provides lightweight structural characteristics combined with high strength-to-weight ratio and thermal conductivity properties that enhance both mechanical performance and thermal management capabilities. The aluminum material provides natural corrosion resistance suitable for harsh environmental conditions encountered during pipeline inspection operations including moisture exposure and chemical contamination. The 3D printing manufacturing process enables complex geometric features including integrated cooling channels, mounting provisions, and structural reinforcements that would be difficult or expensive to achieve through conventional machining processes. Furthermore, the aluminum chassis incorporates post-processing treatments such as anodizing or protective coating application that enhance surface durability and environmental resistance while maintaining thermal conductivity characteristics.

As better shown in FIG. 1B, the modular pipe inspection robot 100 further comprises a thermal management system 180 comprising a plurality of cooling fins 182 integrated into the rhombohedral body 110. The thermal management system 180 provides active heat dissipation capabilities that maintain operational temperature ranges for electronic components during extended inspection periods while preventing thermal damage to sensitive circuits. The thermal management system 180 incorporates strategic heat transfer pathways that direct thermal energy from high-temperature components toward the plurality of cooling fins 182 for convective dissipation to the external environment. Additionally, the thermal management system 180 integrates with the overall mechanical architecture of the rhombohedral body 110 without compromising structural integrity or magnetic wheel operation capabilities.

The plurality of cooling fins 182 integrated into the rhombohedral body 110 create an extended surface area for convective heat transfer between internal heat-generating components and the external environment. The plurality of cooling fins 182 utilize geometric configurations that maximize heat transfer coefficient while maintaining structural durability during mobile operations and mechanical loading conditions. The positioning of the plurality of cooling fins 182 within the rhombohedral body 110 creates thermal pathways that efficiently conduct heat from electronic components toward external surfaces for dissipation. It may be contemplated that the plurality of cooling fins 182 incorporate materials with high thermal conductivity such as aluminum or copper alloys to minimize thermal resistance between heat sources and dissipation surfaces. Also, the plurality of cooling fins 182 are arranged to create airflow channels that enhance natural convection heat transfer during both stationary measurement operations and mobile inspection navigation.

In an aspect of the present disclosure, the plurality of cooling fins 182 are arranged on the rhombohedral body 110 on any of the first side 112a, the second side 112b, the rear end 112c and the lower surface 112e. This arrangement of the plurality of cooling fins 182 maximizes thermal dissipation efficiency by distributing heat exchange surfaces across multiple exterior faces of the rhombohedral body 110 to accommodate varying environmental conditions and operational orientations. The cooling fins 182 positioned on the first side 112a and the second side 112b provide lateral heat dissipation that maintains thermal balance during directional changes or curved pipe navigation where airflow patterns may vary. The cooling fins 182 located at the rear end 112c (as shown in the illustrated example of FIG. 1B) create thermal pathways for power supply components and control electronics that typically generate the highest thermal loads during operational cycles. Furthermore, the cooling fins 182 integrated into the lower surface 112e provide direct heat transfer to pipe surfaces that can serve as thermal sinks during extended stationary measurement operations.

In present aspects, the cooling fins 182 are arranged in a pattern selected from one of a radial pattern, a longitudinal pattern and a combination of the radial pattern and the longitudinal pattern. The radial pattern arrangement creates heat dissipation pathways that extend outward from central heat-generating components toward exterior surfaces of the rhombohedral body 110 to maximize thermal gradient and heat transfer effectiveness. The longitudinal pattern provides thermal pathways that align with the primary direction of travel and airflow during inspection operations to optimize convective heat transfer during navigation. Furthermore, the combination pattern integrates both radial and longitudinal elements to optimize heat transfer under varying operational conditions and orientations while maintaining structural integrity of the rhombohedral body 110.

Figure 3:
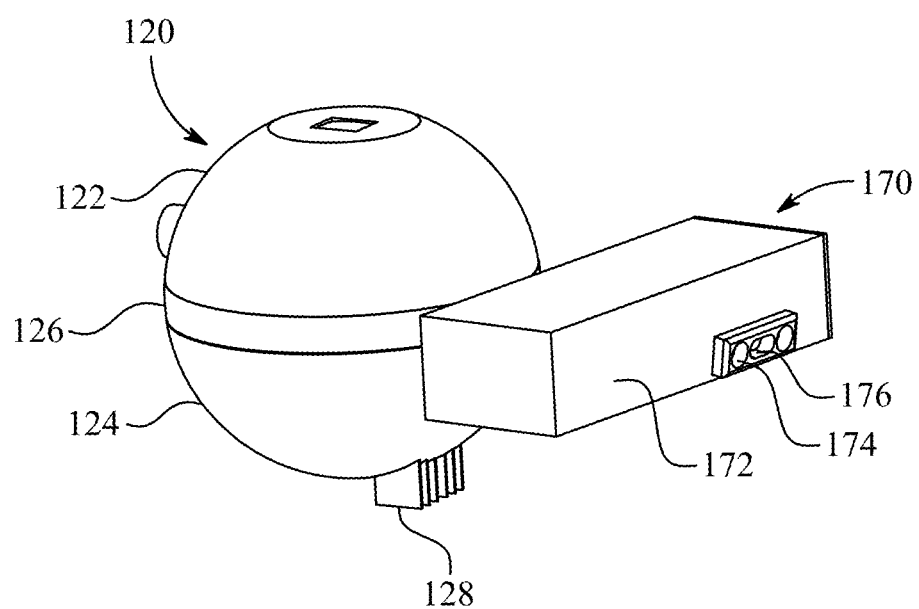
FIG. 3 is an exemplary perspective view of a spherical sensor unit along with a power supply of the modular pipe inspection robot, according to certain embodiments.

Referring now to FIG. 3, in conjunction with FIG. 1C, illustrated are the components of the spherical sensor unit 120 showing the modular sensor housing architecture. The spherical sensor unit 120 provides the primary housing for measurement sensors, control electronics, and power management components in a thermally efficient spherical configuration that maximizes surface area for heat dissipation. The spherical sensor unit 120 comprises a hemispherical upper portion 122 and a hemispherical lower portion 124 that combine to create the complete spherical housing for internal components. The modular design of the spherical sensor unit 120 enables rapid replacement of sensor packages or electronic components without affecting the structural integrity of the rhombohedral body 110 or propulsion systems.

In the spherical sensor unit 120, the hemispherical upper portion 122 provides the primary housing for measurement sensors and optical components that require direct exposure to external inspection targets while maintaining environmental protection. The hemispherical upper portion 122 incorporates transparent or translucent materials in sensor viewing areas while maintaining structural protection for sensitive electronic components against impact damage and environmental contamination. Further, the hemispherical lower portion 124 serves as the primary housing for power supply components and control electronics that generate significant thermal loads during operation and require efficient thermal management. The hemispherical lower portion 124 incorporates thermal conduction pathways that efficiently transfer heat from internal components toward exterior surfaces for dissipation through the thermal management system 180. The hemispherical lower portion 124 may include mounting interfaces that secure electronic components while allowing thermal expansion and contraction during temperature cycling without mechanical stress or connection failure. Furthermore, the hemispherical lower portion 124 incorporates electrical connection pathways that maintain signal integrity between internal components and external interfaces on the rhombohedral body 110 while accommodating mechanical separation for maintenance operations.

In some aspects, the hemispherical upper portion 122 and the hemispherical lower portion 124 of the spherical sensor unit 120 comprise 3D printed plastic material. The 3D printed plastic construction provides lightweight characteristics while maintaining adequate strength for sensor protection and environmental sealing applications in field operations. The plastic material selection includes polymers such as ABS, PLA, or PETG that provide dimensional stability, chemical resistance, and temperature stability suitable for the operating environment. The 3D printing manufacturing process enables complex internal geometries including wire routing channels, component mounting features, and cooling air passages that optimize internal organization and thermal management. Furthermore, the plastic material provides electrical insulation properties that prevent electromagnetic interference with sensitive measurement circuits while maintaining structural integrity under mechanical loading conditions.

Also, as illustrated, the modular pipe inspection robot 100 comprises a band 126 configured to join the hemispherical upper portion 122 and the hemispherical lower portion 124 of the spherical sensor unit 120. The band 126 provides a mechanically secure interface between the upper and lower hemispheres while maintaining electrical continuity for sensor circuits and control systems across the separable joint. The geometric design of the band 126 maintains the overall spherical configuration of the spherical sensor unit 120 while providing mounting surfaces for external sensors or interface components that require positioning at the hemisphere junction. In some examples, the band 126 may incorporate quick-release mechanisms such as twist-lock or lever-actuated fasteners that facilitate rapid disassembly for maintenance or component replacement without requiring specialized tools or extensive disassembly procedures. The band 126 may also incorporate sealing elements such as O-rings or gaskets that prevent environmental contamination of internal components while allowing thermal expansion during temperature variations without seal failure or contamination ingress.

Further, as illustrated, the modular pipe inspection robot 100 comprises a power supply 170 located in the hemispherical lower portion 124. The power supply 170 provides electrical energy for all electronic components of the modular pipe inspection robot 100 including sensors, control circuits, propulsion systems, and communication equipment during operational cycles. The power supply 170 incorporates rechargeable battery technology such as lithium-ion cells that maintain operational capacity for extended inspection periods without external power connections while providing stable voltage regulation under varying load conditions. The positioning of the power supply 170 in the hemispherical lower portion 124 creates a low center of gravity that enhances magnetic adhesion stability during navigation operations while optimizing thermal management through proximity to the cooling fins 182. The power supply 170 includes thermal management features such as heat spreaders and thermal interface materials that safely dissipate heat generated during charging and discharging cycles without compromising battery performance or safety. Additionally, the power supply 170 incorporates protection circuits including overcurrent protection, undervoltage protection, and thermal shutdown features that prevent component damage from electrical faults or thermal overload conditions.

The location of the power supply 170 within the hemispherical lower portion 124 positions the highest heat-generating component adjacent to thermal dissipation pathways integrated into the thermal management system 180 for efficient heat transfer. The power supply 170 utilizes thermal interface materials such as thermal pads or thermal paste that efficiently conduct heat toward the plurality of cooling fins 182 for convective dissipation to the external environment. The power supply 170 includes monitoring circuits that provide real-time status information including battery voltage levels, current consumption, internal temperature readings, and remaining capacity estimates for operational planning and safety monitoring. Furthermore, the power supply 170 incorporates safety features such as thermal shutdown protection, charge balancing circuits, and fault isolation systems that prevent overheating during operation or charging procedures while maintaining operational reliability.

In an aspect of the present disclosure, the power supply 170 includes a rechargeable battery. The rechargeable battery utilizes battery chemistry such as lithium-ion technology that provides high energy density, extended cycle life, and stable performance characteristics suitable for mobile robotic applications. The rechargeable battery may incorporate multiple cells configured in series and parallel arrangements to achieve required voltage and capacity specifications while maintaining balanced charging and discharging characteristics. For present purposes, the rechargeable battery may include integrated battery management systems that monitor individual cell voltages, temperatures, and charging states to prevent overcharging, over-discharging, and thermal damage during operational and storage conditions.

Further, as better illustrated in FIG. 3, the modular pipe inspection robot 100 comprises a plurality of sensors mounted within the spherical sensor unit 120. The plurality of sensors provide measurement capabilities for various physical properties of pipe surfaces and environmental conditions during inspection operations while maintaining measurement accuracy across varying environmental conditions. The plurality of sensors incorporate calibration procedures and compensation algorithms that maintain measurement accuracy across temperature variations, humidity changes, and mechanical vibration conditions encountered during mobile operations. The mounting configuration of the plurality of sensors within the spherical sensor unit 120 provides mechanical protection against impact damage while maintaining optimal field-of-view characteristics for measurement targets and environmental monitoring. The plurality of sensors utilize standardized electrical interfaces and communication protocols that facilitate rapid replacement or reconfiguration for different inspection requirements without requiring extensive system reprogramming or calibration procedures. Additionally, the plurality of sensors incorporate signal processing capabilities including noise filtering, signal amplification, and digital conversion that enhance measurement resolution and reduce electromagnetic interference from propulsion systems and control electronics.

In one or more aspects of the present disclosure, the plurality of sensors comprises a humidity sensor 130, a temperature sensor 132, a first ultrasonic sensor 134, a second ultrasonic sensor 136, and an infrared temperature sensor 138. The humidity sensor 130 measures ambient moisture levels in the operating environment that affect measurement accuracy and equipment reliability during inspection operations while providing environmental data for measurement compensation algorithms. The temperature sensor 132 monitors ambient temperature conditions for environmental compensation of other sensor measurements and thermal management system operation optimization. The first ultrasonic sensor 134 and the second ultrasonic sensor 136 provide distance measurement capabilities for navigation assistance, obstacle detection, and surface profiling applications that enhance operational safety and measurement accuracy. Furthermore, the infrared temperature sensor 138 measures surface temperatures of pipe materials for thermal analysis, defect detection, and material condition assessment applications.

In an aspect of the present disclosure, the hemispherical upper portion 122 comprises a first cutout 123a located near the front end 112d and a second cutout 123b located adjacent the first cutout 123a. The first cutout 123a is configured to hold the first ultrasonic sensor 134, and the second cutout 123b is configured to hold the second ultrasonic sensor 136. The first cutout 123a provides mounting geometry that maintains accurate positioning of the first ultrasonic sensor 134 relative to measurement targets while ensuring proper acoustic coupling for accurate distance measurements. The positioning of the first cutout 123a near the front end 112d provides forward-looking measurement capability for navigation assistance and obstacle detection during mobile operations while maintaining protection from impact damage. The second cutout 123b provides similar mounting and protection features as the first cutout 123a while maintaining appropriate spacing for stereo ranging applications and triangulation measurements that enhance distance accuracy and target profiling capabilities. The positioning of the second cutout 123b adjacent to the first cutout 123a enables triangulation measurements for enhanced distance accuracy and three-dimensional target profiling while maintaining compact sensor integration within the spherical sensor unit 120.

Further, in an aspect of the present disclosure, the band 126 is configured to hold the infrared temperature sensor 138. The integration of the infrared temperature sensor 138 into the band 126 provides optimal positioning for surface temperature measurements while maintaining mechanical protection during mobile operations and environmental exposure. The mounting configuration within the band 126 enables the infrared temperature sensor 138 to maintain appropriate field-of-view angles for accurate temperature measurements of pipe surfaces while preventing interference from internal heat sources or external environmental factors. Furthermore, the band 126 provides thermal isolation for the infrared temperature sensor 138 to prevent measurement interference from internally generated heat sources while maintaining environmental protection and mechanical security.

Figure 6:
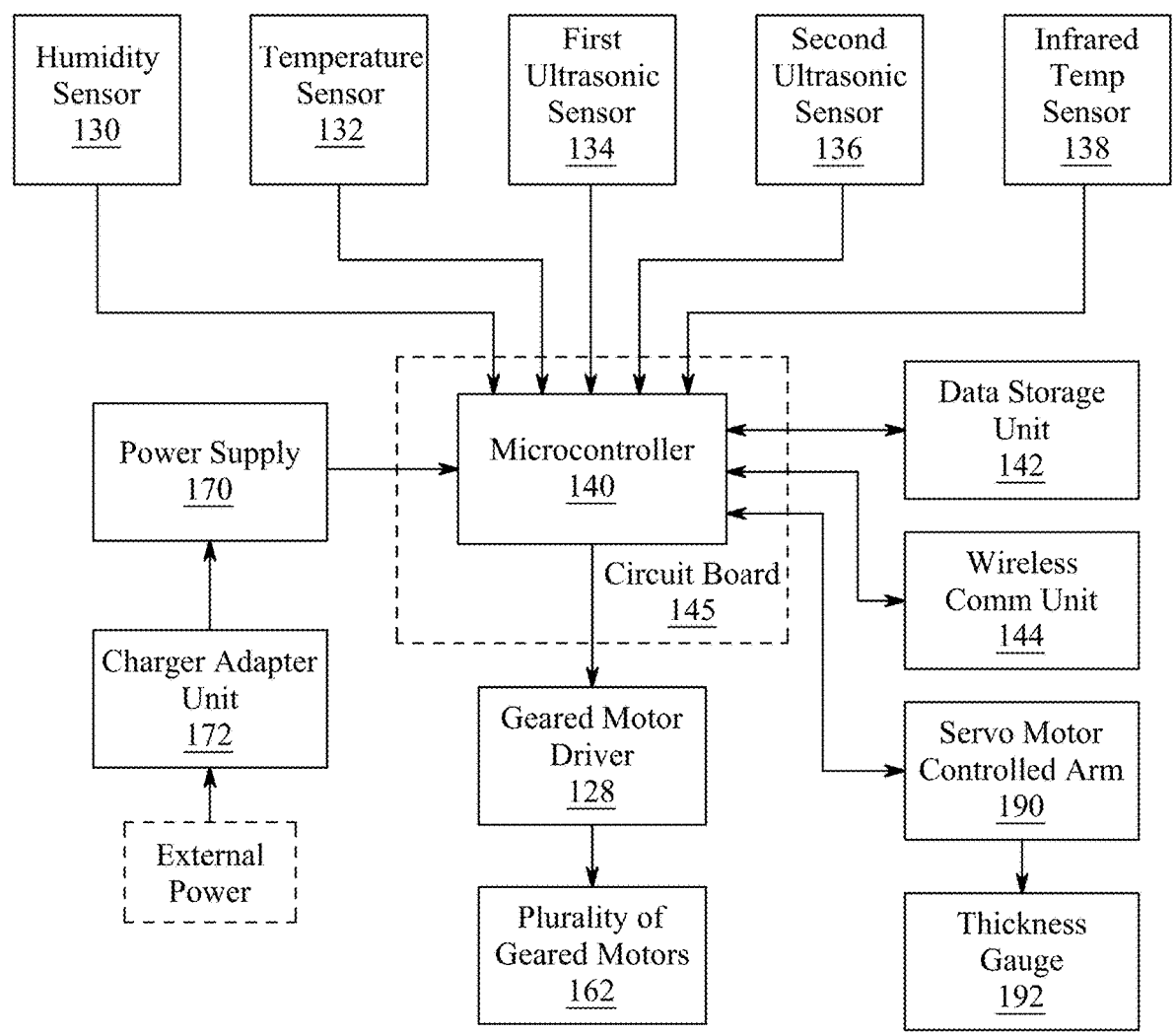
FIG. 6 is an exemplary schematic block diagram of a control system showing operative connections between electronic components of the modular pipe inspection robot, according to certain embodiments.

Referring to FIG. 1C, as shown, the modular pipe inspection robot 100 comprises a microcontroller 140 positioned within the spherical sensor unit 120. FIG. 6 provides a detailed schematic of a control system utilizing the microcontroller 140 as a central processing unit that coordinates sensor operations, motor control functions, data management operations, thermal management, and communication functions. The microcontroller 140 is operatively connected to a plurality of geared motors 162, the power supply 170 and the plurality of sensors. The microcontroller 140 provides central processing capabilities for sensor data acquisition, propulsion control, thermal management, and communication functions while maintaining real-time operation characteristics suitable for mobile robotic applications. For present purposes, the microcontroller 140 incorporates real-time operating system capabilities that manage multiple concurrent tasks including sensor sampling, motor control algorithms, data logging operations, and communication protocols without timing conflicts or performance degradation. In the modular pipe inspection robot 100, the positioning of the microcontroller 140 within the spherical sensor unit 120 minimizes electrical cable lengths and reduces electromagnetic interference while providing efficient thermal management for processing circuits through the thermal management system 180.

The operative connections between the microcontroller 140 and the plurality of geared motors 162 enable speed control, direction control, and torque control for magnetic wheel propulsion systems during navigation operations. The microcontroller 140 generates pulse-width modulated control signals that regulate motor speed and torque characteristics based on navigation requirements, surface conditions, and obstacle avoidance algorithms while maintaining stable magnetic adhesion. The operative connection to the power supply 170 provides both electrical power distribution and monitoring capabilities that enable the microcontroller 140 to implement power management strategies, battery monitoring, and energy optimization algorithms for extended operational duration. Furthermore, the operative connections to the plurality of sensors enable the microcontroller 140 to coordinate measurement timing, perform signal processing operations, implement calibration procedures, and manage data acquisition for accurate and reliable measurement operations.

The modular pipe inspection robot 100 further comprises a data storage unit 142 operatively connected to the microcontroller 140. Herein, each of the plurality of sensors is configured to measure at least one physical property of the external surface of the pipe and transmit a measurement signal to the data storage unit 142. The data storage unit 142 is configured to store the measurement signals. The data storage unit 142 provides non-volatile memory capabilities such as flash memory or solid-state drives that preserve sensor data during power cycling, system failures, or extended storage periods while maintaining data integrity and accessibility. In some examples, the data storage unit 142 may incorporate file management systems that organize measurement data by timestamp, geographical location, sensor type, and inspection sequence for efficient retrieval and analysis operations. The operative connection between the data storage unit 142 and the microcontroller 140 enables real-time data logging with minimal processing overhead and maintains system responsiveness during concurrent measurement and navigation operations.

The configuration of each sensor within the plurality of sensors to measure at least one physical property of the external surface of the pipe enables detailed condition assessment including structural integrity, thermal characteristics, and environmental factors during inspection operations. In particular, herein, the first ultrasonic sensor 134 and the second ultrasonic sensor 136 are configured to measure a distance along the pipe and transmit a distance signal to a data storage unit 142 for navigation assistance, obstacle avoidance, and measurement positioning applications. The measurement signals transmitted to the data storage unit 142 may include timestamp information, calibration data, measurement units, and raw measurement values for post-processing analysis and quality verification. The data storage unit 142 implements error detection and correction algorithms such as cyclic redundancy checks that maintain data integrity during storage operations, retrieval operations, and data transfer procedures while preventing data corruption from electrical interference or mechanical shock.

The modular pipe inspection robot 100 further comprises a wireless communication unit 144 operatively connected to the microcontroller 140. Herein, the wireless communication unit 144 is configured to transmit the measurement signals. The wireless communication unit 144 provides real-time data transmission capabilities that enable remote monitoring of inspection operations, system status, and measurement results by operators at remote locations or control centers. For present purposes, the wireless communication unit 144 may incorporate multiple communication protocols including Wi-Fi, Bluetooth, and cellular connections for flexible deployment in various operational environments with different communication infrastructure availability. The operative connection to the microcontroller 140 enables the wireless communication unit 144 to transmit sensor data, system status information, diagnostic messages, and emergency alerts to remote operators while maintaining real-time communication capabilities. Furthermore, the wireless communication unit 144 incorporates bidirectional communication capabilities that enable remote control commands, configuration updates, and software upgrades without requiring physical access to the modular pipe inspection robot 100.

Further, as discussed and shown in FIGS. 1A-1C and FIG. 2, the modular pipe inspection robot 100 comprises the plurality of magnet wheels 160 located beneath the rhombohedral body 110. The plurality of magnet wheels 160 provide magnetic adhesion forces that maintain secure contact between the modular pipe inspection robot 100 and ferromagnetic pipe surfaces during navigation operations, measurement operations, and stationary positioning. The plurality of magnet wheels 160 may incorporate wheel geometries such as crowned or contoured surfaces that maximize contact area while maintaining rolling efficiency during forward motion, reverse motion, and directional changes on curved or irregular surfaces. The positioning of the plurality of magnet wheels 160 beneath the rhombohedral body 110 creates a stable magnetic base that distributes adhesion forces evenly across the contact interface while maintaining low center of gravity for enhanced stability.

In the present configuration, the magnetic adhesion provided by the plurality of magnet wheels 160 enables the modular pipe inspection robot 100 to navigate inclined surfaces, vertical sections, and inverted orientations without losing contact with pipe surfaces or compromising operational stability. The plurality of magnet wheels 160 utilize magnetic field configurations that provide strong holding forces during stationary operations while enabling controlled release for directional changes, obstacle avoidance, or intentional detachment procedures. In some examples, the plurality of magnet wheels 160 include suspension systems such as spring-loaded mounts or compliant interfaces that maintain contact pressure during navigation over surface irregularities, pipe joints, or obstacles without losing magnetic adhesion. Further, the plurality of magnet wheels 160 may incorporate debris-clearing features such as scrapers or brush elements that prevent accumulation of magnetic particles that could interfere with rolling motion or reduce magnetic coupling effectiveness.

In some aspects, the plurality of magnet wheels 160 each comprise a plurality of alternating pole magnets. Herein, the alternating pole magnets are selected from the group comprising a plurality of permanent magnets and a plurality of electromagnets. The alternating pole configuration creates magnetic field patterns that enhance adhesion strength while providing controllable release characteristics for navigation maneuvers and intentional detachment operations. The permanent magnets provide consistent magnetic force without electrical power requirements while maintaining reliable adhesion during power interruptions or system failures. The electromagnets enable variable magnetic strength control based on operational requirements such as enhanced adhesion for inclined surfaces or reduced adhesion for easy detachment and repositioning operations. Furthermore, the alternating pole arrangement distributes magnetic forces across the wheel contact area to prevent surface damage while maintaining secure adhesion and enabling smooth rolling motion during navigation operations.

The modular pipe inspection robot 100 further comprises the plurality of geared motors 162 configured to rotate the plurality of magnetic wheels 160. The plurality of geared motors 162 provide speed control, direction control, and torque control capabilities that enable smooth navigation across varying surface conditions, incline angles, and obstacle configurations while maintaining magnetic adhesion. The plurality of geared motors 162 may incorporate gear reduction systems such as planetary gearboxes or worm gear assemblies that multiply torque output while providing fine speed control resolution for precise positioning operations and smooth acceleration characteristics. The plurality of geared motors 162 may also utilize brushless motor technology that provides high efficiency, reduced maintenance requirements, and extended operational lifespan compared to brushed motor alternatives. The configuration of the plurality of geared motors 162 which rotate the magnetic wheels 160 creates independent wheel control that enables steering functions, turning maneuvers, and stabilization functions during navigation while maintaining coordinated motion for straight-line travel. In one or more examples, the plurality of geared motors 162 may include encoder feedback systems such as optical encoders or magnetic encoders that provide accurate position information and speed information for closed-loop control algorithms and navigation precision. The rotation of the plurality of magnetic wheels 160 by the plurality of geared motors 162 enables omnidirectional navigation capabilities including forward motion, reverse motion, rotational motion, and steering maneuvers for complete mobility control during inspection operations.

In some aspects, each one of the plurality of geared motors 162 is connected to an axle shaft 164 which extends through one of the plurality of magnet wheels 160. The axle shaft 164 connection provides direct mechanical coupling between motor output and wheel rotation while maintaining precise alignment and minimal backlash for accurate speed control and positioning accuracy. The axle shaft 164 incorporates bearing systems such as sealed ball bearings that support radial loads and axial loads while enabling smooth rotation and extended operational life under varying load conditions. Furthermore, the extension of the axle shaft 164 through the magnet wheel 160 provides balanced load distribution and prevents eccentric forces that could cause vibration, uneven wear, or mechanical instability during operation.

In an aspect of the present disclosure, as illustrated in FIG. 3, the modular pipe inspection robot 100 further comprises a geared motor driver 128 connected to the hemispherical lower portion 124 of the spherical sensor unit 120. Herein, the geared motor driver 128 is connected to the microcontroller 140 and to the plurality of geared motors 162. The microcontroller 140 is configured to generate drive signals to actuate the plurality of geared motors 162 to rotate the plurality of magnet wheels 160 and drive the modular pipe inspection robot 100 along the external surface of the pipe. The generation of drive signals by the microcontroller 140 includes trajectory planning algorithms that coordinate multiple motor movements for navigation, positioning operations, and collision avoidance maneuvers during inspection operations. The actuation of the plurality of geared motors 162 through the drive signals enables the modular pipe inspection robot 100 to maintain constant speed during inspection operations and perform controlled maneuvers around obstacles, pipe fittings, or surface irregularities while maintaining magnetic adhesion and measurement accuracy. It may be appreciated that the connection of the geared motor driver 128 to the hemispherical lower portion 124 positions heat-generating power electronics adjacent to thermal management pathways within the spherical sensor unit 120 for efficient heat dissipation through the thermal management system 180.

In some aspects of the present disclosure, as illustrated in FIG. 1C, the modular pipe inspection robot 100 further comprises a servo motor-controlled arm 190 located on an outer surface of the rhombohedral body 110 and a thickness gauge 192 located on a distal end of the servo motor-controlled arm 190. Herein, the thickness gauge 192 is configured to measure a thickness of a wall of the pipe. Further, the microcontroller 140 is configured to actuate the servo motor-controlled arm 190 and the data storage unit 142 is configured to receive a measurement of the thickness of the wall of the pipe. The servo motor-controlled arm 190 provides positioning capabilities with multiple degrees of freedom that enable the thickness gauge 192 to maintain proper contact with pipe surfaces during measurement operations while accommodating various pipe orientations and surface geometries. For present purposes, the servo motor-controlled arm 190 may incorporate multiple degrees of freedom such as rotation, extension, and articulation that accommodate various pipe orientations, surface curvatures, and accessibility requirements without requiring repositioning of the modular pipe inspection robot 100.

The location of the servo motor-controlled arm 190 on the outer surface provides clearance for measurement operations while maintaining structural integration with the rhombohedral body 110 and avoiding interference with magnetic wheel operation or navigation capabilities. In some examples, the servo motor-controlled arm 190 may incorporate force feedback capabilities such as strain gauges or torque sensors that prevent damage to the thickness gauge 192 during contact with irregular surfaces, obstacles, or unexpected surface conditions. Additionally, the servo motor-controlled arm 190 may incorporate retraction mechanisms that protect the thickness gauge 192 during navigation between measurement locations and prevent damage from contact with obstacles or surface irregularities.

The thickness gauge 192 located on the distal end of the servo motor-controlled arm 190 utilizes ultrasonic measurement principles, magnetic measurement principles, or electromagnetic measurement principles to determine pipe wall thickness without requiring access to interior pipe surfaces or destructive testing procedures. The thickness gauge 192 may incorporate calibration procedures and compensation algorithms that account for material properties, temperature variations, surface conditions, and coating thickness for accurate thickness measurements across different pipe materials and environmental conditions. The configuration of the thickness gauge 192 to measure pipe wall thickness enables detection of corrosion damage, wear patterns, or structural defects that affect pipeline integrity and safety while providing quantitative data for condition assessment. For some configurations, the thickness gauge 192 may incorporate multiple measurement modes that accommodate different pipe materials including carbon steel, stainless steel, aluminum, and composite materials while maintaining measurement accuracy and reliability.

Further, as illustrated in FIG. 1C and FIG. 6, the modular pipe inspection robot 100 comprises a circuit board 145 located between the hemispherical upper portion 122 and the hemispherical lower portion 124 of the spherical sensor unit 120. Herein, the circuit board 145 is configured to hold the microcontroller 140, the data storage unit 142, the wireless communication unit 144 and provide connections between the microcontroller 140 and the power supply 170, the data storage unit 142, the wireless communication unit 144, the plurality of geared motors 162, the plurality of sensors and the servo-controlled arm 190. The circuit board 145 provides a centralized mounting platform that organizes electronic components within the spherical sensor unit 120 while minimizing electromagnetic interference between circuits and maintaining compact packaging for thermal management efficiency. The circuit board 145 may incorporate multilayer construction with separate power distribution layers and signal routing layers for improved noise immunity and signal integrity between sensitive measurement circuits and high-power propulsion control circuits.

The location of the circuit board 145 between hemispheres enables efficient thermal management by distributing heat sources across the spherical volume and maintaining thermal pathways to external dissipation surfaces through the thermal management system 180. The circuit board 145 includes standardized connector interfaces such as multi-pin connectors or modular connection systems that facilitate rapid assembly and maintenance procedures while maintaining electrical reliability and environmental protection. Additionally, the circuit board 145 incorporates electromagnetic shielding features such as ground planes and shielding materials that prevent interference with sensitive measurement circuits from high-power switching circuits or external electromagnetic sources.

Further, as illustrated in FIG. 1C and FIG. 3, the modular pipe inspection robot 100 comprises a charge adapter unit 172 including a power port 174. Herein, the charge adapter unit 172 is configured to insert into a cutout in the rear end 112c of the rhombohedral body 110. The power supply 170 includes a rechargeable battery (as discussed). Further, the charge adapter unit 172 includes power receptacles 176 configured to connect to a power source to recharge the rechargeable battery of the power supply 170. The charge adapter unit 172 provides external power connection capabilities that enable battery charging operations without disassembly of the modular pipe inspection robot 100 or exposure of internal components to environmental contamination. The charge adapter unit 172 may incorporate environmental sealing features such as gaskets and sealing covers that protect charging circuits from moisture ingress and contamination during field deployment while maintaining electrical safety and operational reliability.

In the present configuration, the insertion of the charge adapter unit 172 into the cutout at the rear end 112c provides convenient access for charging operations while maintaining structural integrity of the rhombohedral body 110 and preserving thermal management pathways. The power receptacles 176 of the charge adapter unit 172 utilize standardized connector types such as industry-standard charging connectors that accommodate various charging equipment and power sources including AC wall adapters, DC vehicle power, and portable charging systems. Furthermore, the charge adapter unit 172 incorporates charge management circuits such as charging controllers and safety circuits that optimize battery charging rates while preventing overcharging, thermal damage, and electrical faults during charging operations.

Figure 4:
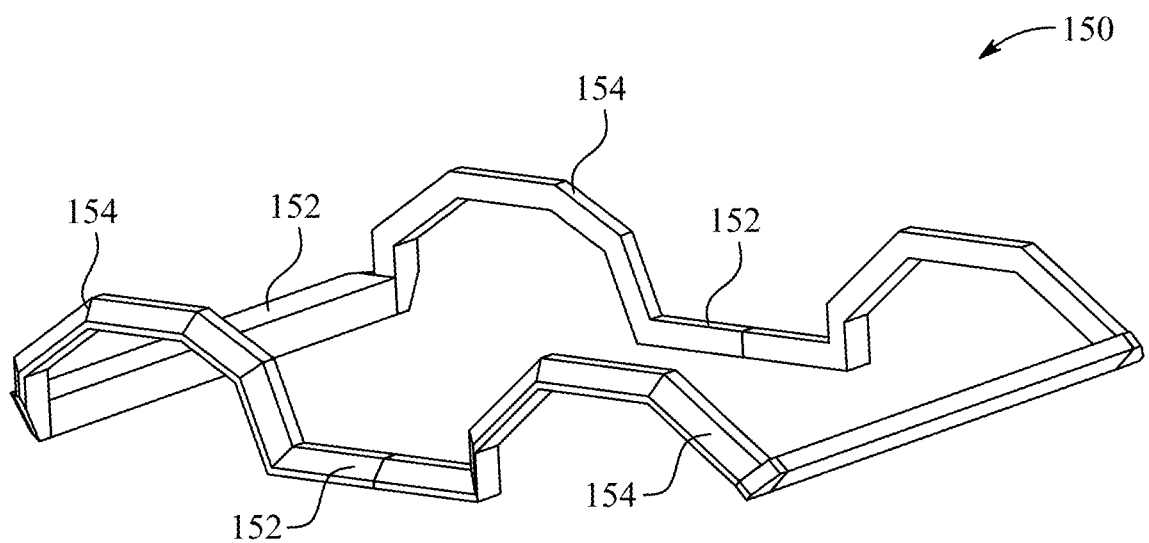
FIG. 4 is an exemplary perspective view of a frame unit of the modular pipe inspection robot, according to certain embodiments.

Referring now to FIG. 4, illustrated is the frame unit 150 in isolation showing its protective configuration and integration features. The modular pipe inspection robot 100 comprises the frame unit 150 configured to surround the rhombohedral body 110 at a location on a lower edge of the rhombohedral body 110. Herein, the frame unit 150 comprises straight portions 152 configured to edge the front end 112d and the rear end 112c and body fender portions 154 configured to edge the wheel well cutouts 114a, 114b. The frame unit 150 provides mechanical protection for the rhombohedral body 110 while maintaining clearance for magnetic wheel operation and surface navigation without interfering with propulsion or adhesion capabilities. The frame unit 150 incorporates impact-resistant materials such as reinforced polymers or lightweight metals that absorb collision forces during navigation operations and protect internal components from damage caused by contact with obstacles or surface irregularities. The configuration of the frame unit 150 to surround the rhombohedral body 110 creates a protective barrier that prevents debris accumulation, reduces environmental contamination, and maintains clearance for thermal management airflow around the cooling fins 182.

In the modular pipe inspection robot 100, the straight portions 152 of the frame unit 150 configured to edge the front end 112*d* and the rear end 112*c* provide longitudinal protection against impact damage while maintaining access to interface connections, service points, and operational controls without requiring frame removal. The straight portions 152 may include reinforcement features such as ribbing or corrugation that distribute impact loads across the frame structure to prevent localized damage and maintain structural integrity under mechanical loading conditions. The body fender portions 154 configured to edge the wheel well cutouts 114*a*, 114*b* provide specific protection for magnetic wheel assemblies while maintaining clearance for wheel rotation, magnetic coupling, and suspension movement during navigation over irregular surfaces. The body fender portions 154 may incorporate flexible materials or hinged sections that accommodate wheel movement and suspension travel during navigation over surface irregularities without restricting propulsion performance or magnetic adhesion capabilities.

Figure 5:
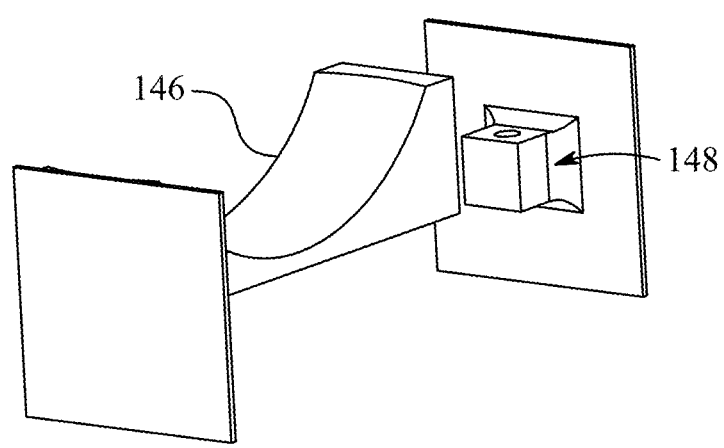
FIG. 5 is an exemplary perspective view of an assembly of a spherical sensor unit holder and a spherical sensor unit lock mechanism of the modular pipe inspection robot, shown in partial exploded configuration, according to certain embodiments.

Referring now to FIG. 5 in conjunction with FIG. 1C, illustrated are a spherical sensor unit holder 146 and a spherical sensor unit lock 148 mechanism in isolation showing the modular retention system. The modular pipe inspection robot 100 comprises the spherical sensor unit holder 146 and the spherical sensor unit lock 148 connected to the spherical sensor unit holder 146. Herein, the spherical sensor unit holder 146 is configured to secure the spherical sensor unit 120 within the rhombohedral body 110. The spherical sensor unit holder 146 provides mounting geometry that maintains accurate alignment between the spherical sensor unit 120 and the rhombohedral body 110 during operation while accommodating thermal expansion and mechanical loading without misalignment or connection failure. In present configuration, the spherical sensor unit holder 146 may incorporate quick-release mechanisms such as quarter-turn fasteners or lever-operated clamps that enable rapid installation and removal of the spherical sensor unit 120 for maintenance, sensor reconfiguration, or component replacement operations without requiring specialized tools or extensive disassembly procedures.

Additionally, the spherical sensor unit holder 146 may include electrical connections such as multi-pin connectors or spring-loaded contacts that maintain continuity between sensor circuits, power distribution systems, and propulsion control systems across the separable interface. The spherical sensor unit holder 146 may also incorporate vibration isolation features such as elastomeric dampers or spring-loaded mounts that prevent mechanical interference with sensitive measurement operations while maintaining secure mechanical retention during navigation and measurement operations. Additionally, the spherical sensor unit holder 146 may include environmental sealing features such as gaskets or sealing rings that protect electrical connections from moisture ingress and contaminant accumulation while maintaining electrical integrity and preventing corrosion damage.

Further, the spherical sensor unit lock 148 connected to the spherical sensor unit holder 146 provides secure retention of the spherical sensor unit 120 during navigation operations, measurement operations, and environmental exposure while preventing accidental release or component loss. For present purposes, the spherical sensor unit lock 148 may incorporate fail-safe mechanisms such as spring-loaded latches or positive-lock designs that prevent accidental release during operation while enabling intentional removal for maintenance procedures through deliberate operator actions. The spherical sensor unit lock 148 may also include visual indicators such as colored markers or position indicators that confirm proper engagement and secure mounting of the spherical sensor unit 120 within the spherical sensor unit holder 146. In present configuration, the spherical sensor unit lock 148 may utilize materials such as stainless steel or corrosion-resistant alloys that maintain locking strength and operational reliability during temperature variations, mechanical loading, and environmental exposure without degradation or failure.

Referring now to FIG. 6, illustrated is a schematic block diagram of the control system showing operative connections between electronic components of the modular pipe inspection robot 100. The control system integrates the microcontroller 140 as a central processing unit that coordinates sensor operations, motor control functions, data management operations, thermal management, and communication functions. The microcontroller 140 maintains operative connections to the power supply 170 that provide both electrical power distribution and battery monitoring capabilities for power management algorithms, energy optimization, and operational planning functions. The microcontroller 140 includes operative connections to the data storage unit 142 and the wireless communication unit 144 that enable real-time data logging, data transmission, and remote communication capabilities for operational monitoring and data analysis. The microcontroller 140 maintains connections to the plurality of sensors including the humidity sensor 130, the temperature sensor 132, the first ultrasonic sensor 134, the second ultrasonic sensor 136, and the infrared temperature sensor 138 for environmental monitoring and measurement operations that support inspection activities and equipment protection.

For present purposes, the control system architecture may incorporate redundant communication pathways and fault detection algorithms that maintain operational reliability during autonomous inspection operations and prevent system failure from component faults or communication errors. The microcontroller 140 may further implement real-time control algorithms that coordinate multiple concurrent tasks including sensor data acquisition, motor control operations, thermal management, and communication protocols while maintaining precise timing requirements for accurate measurements and smooth navigation. Furthermore, the control system may include diagnostic capabilities that monitor component health, performance parameters, and operational status for predictive maintenance, fault prevention, and performance optimization during extended operational periods.

Figure 7:
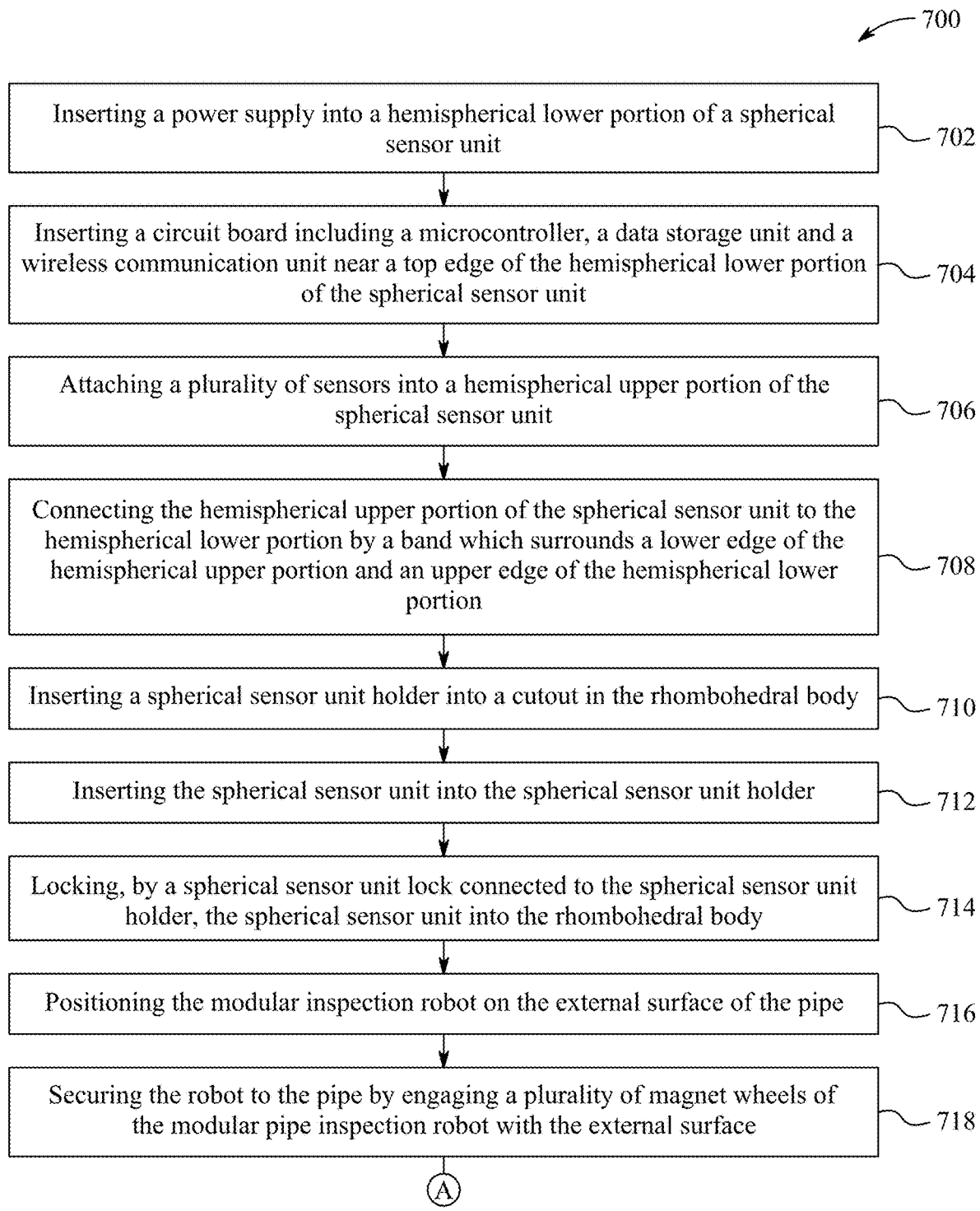
FIG. 7 is an exemplary flowchart of a method for inspecting an external surface of a pipe with the modular pipe inspection robot, according to certain embodiments.
Figure 7:
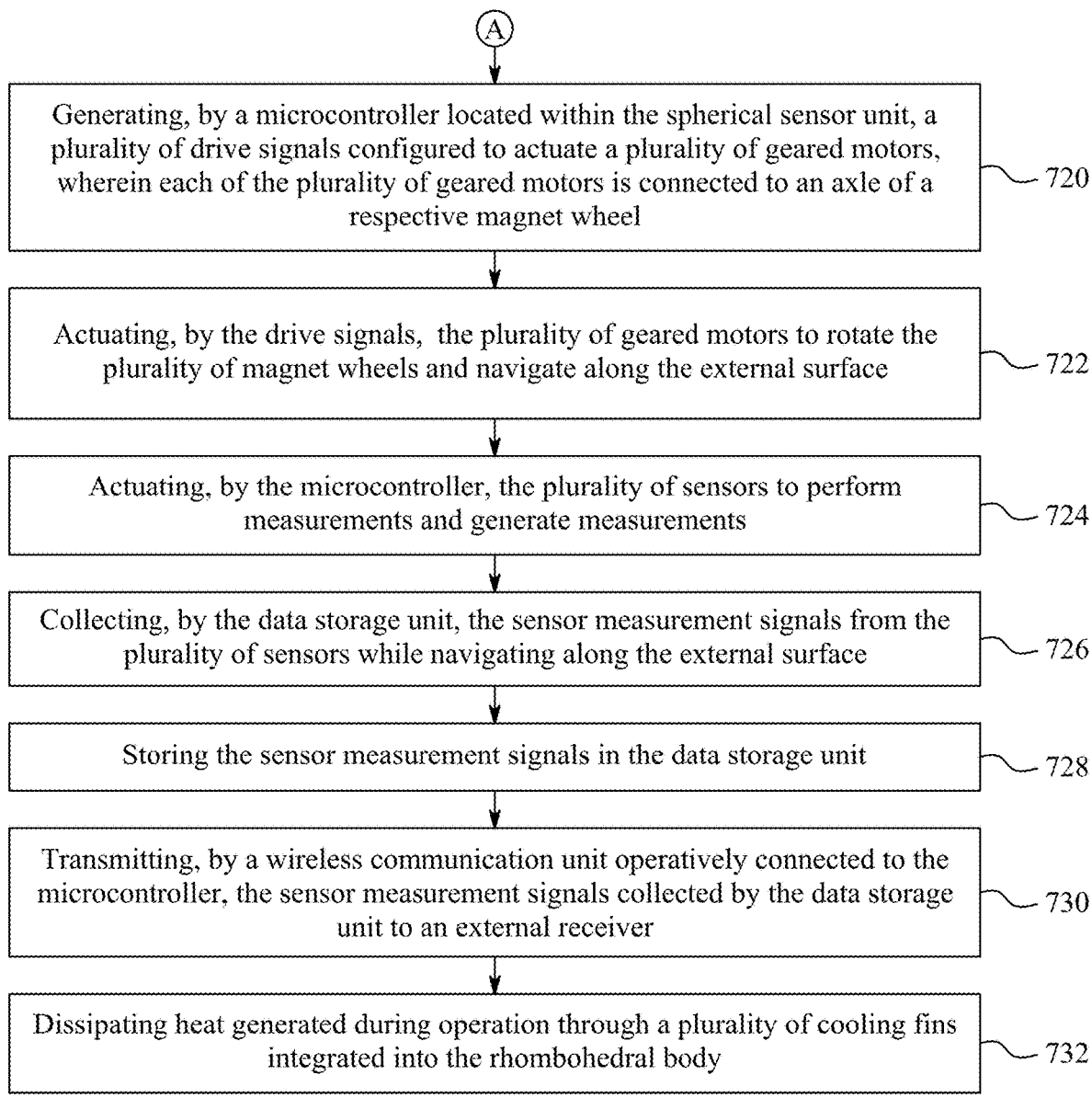

Referring now to FIG. 7, illustrated is a flowchart of a method 700 for inspecting an external surface of a pipe with the modular pipe inspection robot 100. The method 700 provides systematic procedures for assembly operations, deployment procedures, operational control, and data collection using the modular pipe inspection robot 100 while maintaining quality assurance and operational safety. The method 700 incorporates quality assurance steps that verify proper assembly and operational readiness before deployment to prevent equipment damage and ensure measurement accuracy. The method 700 includes safety procedures that protect both equipment and personnel during inspection operations while maintaining operational efficiency and inspection effectiveness. Additionally, the method 700 incorporates data validation steps that ensure measurement accuracy, data completeness, and traceability for inspection documentation and analysis requirements.

At step 702, the method 700 includes inserting the power supply 170 into the hemispherical lower portion 124 of the spherical sensor unit 120. This step ensures that the primary power source is securely housed and positioned to optimize the center of gravity of the modular pipe inspection robot 100 for stable operation. The placement within the hemispherical lower portion 124 also facilitates direct thermal contact with heat dissipation pathways. At step 704, the method 700 includes inserting the circuit board 145 including the microcontroller 140, the data storage unit 142 and the wireless communication unit 144 near a top edge of the hemispherical lower portion 124 of the spherical sensor unit 120. This action centralizes the control and data processing hardware within the protected enclosure of the spherical sensor unit 120. The positioning near the top edge provides convenient access for connecting the plurality of sensors housed in the upper portion.

At step 706, the method 700 includes attaching the plurality of sensors into the hemispherical upper portion 122 of the spherical sensor unit 120. This step populates the sensor module with the required instruments for a specific inspection task. The secure attachment ensures that each sensor maintains its calibrated orientation and is protected from the external environment. At step 708, the method 700 includes connecting the hemispherical upper portion 122 of the spherical sensor unit 120 to the hemispherical lower portion 124 by the band 126 which surrounds a lower edge of the hemispherical upper portion 122 and an upper edge of the hemispherical lower portion 124. This procedure mechanically joins and environmentally seals the two halves of the spherical sensor unit 120. The connection establishes a self-contained, protected module for all internal electronic components.

At step 710, the method 700 includes inserting the spherical sensor unit holder 146 into a cutout in the rhombohedral body 110. The insertion of the holder 146 establishes the mechanical and electrical interface point between the two main sub-assemblies of the modular pipe inspection robot 100. At step 712, the method 700 includes inserting the spherical sensor unit 120 into the spherical sensor unit holder 146. This modular integration allows for rapid field configuration of the modular pipe inspection robot 100 with different sensor payloads. At step 714, the method 700 includes locking, by the spherical sensor unit lock 148 connected to the spherical sensor unit holder 146, the spherical sensor unit 120 into the rhombohedral body 110. This step secures the sensor module to the chassis, preventing disconnection during operation and ensuring the integrity of the electrical and mechanical connections. The locking action confirms that the modular pipe inspection robot 100 is fully assembled and ready for deployment.

At step 716, the method 700 includes positioning the modular pipe inspection robot 100 on the external surface of the pipe. This is the initial deployment step where the system is placed at the starting point of the inspection path. At step 718, the method 700 includes securing the robot to the pipe by engaging the plurality of magnet wheels 160 of the modular pipe inspection robot 100 with the external surface. This is the initial deployment step where the system is placed at the starting point of the inspection path. At step 720, the method 700 includes generating, by the microcontroller 140 located within the spherical sensor unit 120, a plurality of drive signals configured to actuate the plurality of geared motors 162, wherein each of the plurality of geared motors 162 is connected to an axle of a respective magnet wheel 160. This step initiates the locomotion control sequence within the central processing unit. The generation of these signals translates high-level navigation commands into low-level motor control instructions. At step 722, the method 700 includes actuating, by the drive signals, the plurality of geared motors 162 to rotate the plurality of magnet wheels 160 and navigate along the external surface. This action converts the electrical drive signals into mechanical motion, propelling the modular pipe inspection robot 100 along the pipe.

At step 724, the method 700 includes actuating, by the microcontroller 140, the plurality of sensors to perform measurements and generate measurements. The actuation of the sensors ensures that data is collected systematically as the modular pipe inspection robot 100 navigates its inspection path. At step 726, the method 700 includes collecting, by the data storage unit 142, the sensor measurement signals from the plurality of sensors while navigating along the external surface. This collection process creates a comprehensive record of condition of the pipe correlated with position of the modular pipe inspection robot 100. At step 728, the method 700 includes storing the sensor measurement signals in the data storage unit 142. This ensures that inspection data is preserved for post-mission analysis even in the event of power loss or communication failure. At step 730, the method 700 includes transmitting, by the wireless communication unit 144 operatively connected to the microcontroller 140, the sensor measurement signals collected by the data storage unit 142 to an external receiver. This step enables real-time monitoring of the inspection progress and immediate review of collected data by a remote operator.

At step 732, the method 700 includes dissipating heat generated during operation through the plurality of cooling fins 182 integrated into the rhombohedral body 110. This step is performed continuously throughout the operation to maintain the internal components of the modular pipe inspection robot 100 within their specified operating temperature ranges. The effective dissipation of heat ensures the long-term reliability and consistent performance of the electronic systems of the modular pipe inspection robot 100.

In some aspects, the method 700 further comprises receiving, by the data storage unit 142, humidity measurement signals generated by the humidity sensor 130, temperature measurement signals of an ambient temperature surrounding the modular pipe inspection robot 100, generated by the temperature sensor 132, distance measurement signals generated by the first ultrasonic sensor 134, distance measurement signals generated by the second ultrasonic sensor 136, and a temperature of the external surface of the pipe generated by the infrared temperature sensor 138. The humidity and ambient temperature signals provides environmental context, which is used to compensate other sensor readings and assess external corrosion risks. The distance measurement signals allow for autonomous navigation, obstacle avoidance, and creating a spatial map of the inspection area. The infrared sensor data provides a thermal profile of the pipe surface to identify anomalies such as leaks or insulation failures.

In some aspects, the method 700 further comprises lowering, by servo motor control signals generated by the microcontroller 140, the servo motor-controlled arm 190 located on an outer surface of the rhombohedral body 110, measuring, by the thickness gauge 192 located on a distal end of the servo motor-controlled arm 190, a thickness of a wall of the pipe, receiving, by the microcontroller 140, a thickness measurement signal of the thickness of the wall of the pipe, storing, in the data storage unit 142, the thickness measurement signal, and transmitting, by the wireless communications unit 144, the thickness measurement signal with the sensor measurement signals to the external receiver. This sequence allows for targeted, quantitative assessment of structural integrity of the pipe at specific points of interest identified during navigation. The thickness measurement provides direct data on material loss due to corrosion or erosion, which is required for predictive maintenance scheduling and calculating the remaining operational life of the pipe.

The modular pipe inspection robot 100 of the present disclosure addresses fundamental challenges in pipeline inspection by integrating magnetic adhesion, modular sensor replacement, and thermal management within a single robotic platform. The modular pipe inspection robot 100 combines the rhombohedral body 110 with the detachable spherical sensor unit 120, enabling rapid sensor reconfiguration without complete system disassembly. The thermal management system 180 with the plurality of cooling fins 182 integrated into the rhombohedral body 110 provides efficient heat dissipation for extended operational periods, while the plurality of magnet wheels 160 controlled by the plurality of geared motors 162 ensures reliable adhesion to ferromagnetic pipe surfaces during navigation and measurement operations. The microcontroller 140 positioned within the spherical sensor unit 120 coordinates all system functions including sensor data acquisition, motor control, and thermal management while maintaining real-time operational capabilities.

Existing inspection systems typically require multiple separate devices for different measurement tasks and often lack adequate thermal management for extended operations in harsh environments. The modular pipe inspection robot 100 overcomes these limitations by providing a single platform that accommodates various sensor configurations through the detachable spherical sensor unit 120. The modular pipe inspection robot 100 provides operational flexibility through rapid sensor unit replacement while maintaining structural integrity and thermal management efficiency. The rhombohedral body 110 serves as a stable platform housing the thermal management system 180 and propulsion components, while the spherical sensor unit 120 enables customization for specific inspection requirements without affecting the base platform. The plurality of magnet wheels 160 located beneath the rhombohedral body 110 enables navigation on vertical and inclined pipe surfaces without requiring external support structures or cable management systems. The thermal management system 180 maintains operational temperature ranges for electronic components during extended inspection periods, preventing thermal damage and ensuring measurement accuracy. The integration of the plurality of sensors within the spherical sensor unit 120 with the microcontroller 140 provides condition assessment capabilities including structural integrity analysis, thermal characteristics evaluation, and environmental monitoring within a compact, thermally efficient configuration.

A first embodiment describes a modular pipe inspection robot 100 for operation on an external surface of a pipe, comprising: a spherical sensor unit 120 having a hemispherical upper portion 122 and a hemispherical lower portion 124; a rhombohedral body 110 including a first side 112a, a second side 112b opposite the first side 112a, a rear end 112c, a front end 112d, wheel well cutouts 114a, 114b on the first side 112a and the second side 112b and an angled top surface 116 equipped with a hemispherical opening 118 configured to support the spherical sensor unit 120; a plurality of magnet wheels 160 located beneath the rhombohedral body 110; a plurality of geared motors 162 configured to rotate the plurality of magnet wheels 160; a power supply 170 located in the hemispherical lower portion 124; a plurality of sensors mounted within the spherical sensor unit 120; a microcontroller 140 positioned within the spherical sensor unit 120, wherein the microcontroller 140 is operatively connected to the plurality of geared motors 162, the power supply 170 and the plurality of sensors; and a thermal management system 180 comprising a plurality of cooling fins 182 integrated into the rhombohedral body 110.

In an aspect, the plurality of cooling fins 182 are arranged on the rhombohedral body 110 on any of the first side 112a, the second side 112b opposite the first side 112a, the rear end 112c and a lower surface 112e.

In an aspect, the modular pipe inspection robot 100, further comprises: a data storage unit 142 operatively connected to the microcontroller 140, wherein each of the plurality of sensors is configured to measure at least one physical property of the external surface of the pipe and transmit a measurement signal to the data storage unit 142, wherein the data storage unit 142 is configured to store the measurement signals; and a wireless communication unit 144 operatively connected to the microcontroller 140, wherein the wireless communication unit 144 is configured to transmit the measurement signals.

In an aspect, the plurality of sensors comprises: a humidity sensor 130; a temperature sensor 132; a first ultrasonic sensor 134; a second ultrasonic sensor 136, and an infrared (IR) temperature sensor 138.

In an aspect, the modular pipe inspection robot 100, further comprises: a band 126 configured to join the hemispherical upper portion 122 and the hemispherical lower portion 124 of the spherical sensor unit 120, wherein the band 126 is further configured to hold the IR temperature sensor 138.

In an aspect, the modular pipe inspection robot 100, further comprises: a first cutout 123a located in the hemispherical upper portion 122 near the front end 112d, wherein the first cutout 123a is configured to hold the first ultrasonic sensor 134; and a second cutout 123b located in the hemispherical upper portion 122 adjacent the first cutout 123a, wherein the second cutout 123b is configured to hold the second ultrasonic sensor 136, wherein the first ultrasonic sensor 134 and the second ultrasonic sensor 136 are configured to measure a distance along the pipe and transmit a distance signal to the data storage unit 142.

In an aspect, the modular pipe inspection robot 100, further comprises: a servo motor-controlled arm 190 located on an outer surface of the rhombohedral body 110; and a thickness gauge 192 located on a distal end of the servo motor-controlled arm 190, wherein the thickness gauge 192 is configured to measure a thickness of a wall of the pipe, wherein the microcontroller 140 is configured to actuate the servo motor-controlled arm 190 and the data storage unit 142 is configured to receive a measurement of the thickness of the wall of the pipe.

In an aspect, the modular pipe inspection robot 100, further comprises: a circuit board 145 located between the hemispherical upper portion 122 and the hemispherical lower portion 124 of the spherical sensor unit 120, wherein the circuit board 145 is configured to hold the microcontroller 140, the data storage unit 142, the wireless communication unit 144 and provide connections between the microcontroller 140 and the power supply 170, the data storage unit 142, the wireless communication unit 144, the plurality of geared motors 162, the plurality of sensors and the servo-controlled arm 190.

In an aspect, the rhombohedral body 110 is a 3D-printed aluminum chassis.

In an aspect, the hemispherical upper portion 122 and the hemispherical lower portion 124 of the spherical sensor unit 120 are a 3D printed plastic material.

In an aspect, the cooling fins 182 are arranged in a pattern selected from one of a radial pattern, a longitudinal pattern and a combination of the radial pattern and the longitudinal pattern.

In an aspect, the plurality of magnet wheels 160 each comprise a plurality of alternating pole magnets, wherein the alternating pole magnets are selected from the group comprising a plurality of permanent magnets and a plurality of electromagnets.

In an aspect, each one of the plurality of geared motors 162 is connected to an axle shaft 164 which extends through one of the plurality of magnet wheels 160.

In an aspect, the modular pipe inspection robot 100, further comprises: a geared motor driver 128 connected to the hemispherical lower portion 124 of the spherical sensor unit 120, wherein the geared motor driver 128 is connected to the microcontroller 140 and to the plurality of geared motors 162, wherein the microcontroller 140 is configured to generate drive signals to actuate the plurality of geared motors 162 to rotate the plurality of magnet wheels 160 and drive the modular pipe inspection robot 100 along the external surface of the pipe.

In an aspect, the modular pipe inspection robot 100, further comprises: a frame unit 150 configured to surround the rhombohedral body 110 at a location on a lower edge of the rhombohedral body 110, wherein the frame unit 150 comprises straight portions 152 configured to edge the front end 112d and the rear end 112c and body fender portions 154 configured to edge the wheel well cutouts 114a, 114b.

In an aspect, the modular pipe inspection robot 100, further comprises: a spherical sensor unit holder 146; and a spherical sensor unit lock 148 connected to the spherical sensor unit holder 146, wherein the spherical sensor unit holder 146 is configured to secure the spherical sensor unit 120 within the rhombohedral body 110.

In an aspect, the modular pipe inspection robot 100, further comprises: a charge adapter unit 172 including a power port 174, wherein the charge adapter unit 172 is configured to insert into a cutout in the rear end 112c of the rhombohedral body 110, wherein the power supply 170 includes a rechargeable battery, and wherein the charge adapter unit 172 includes power receptacles 176 configured to connect to a power source to recharge the rechargeable battery of the power supply 170.

A second embodiment describes a method 700 for inspecting an external surface of a pipe with a modular pipe inspection robot 100, comprising: inserting a power supply 170 into a hemispherical lower portion 124 of a spherical sensor unit 120; inserting a circuit board 145 including a microcontroller 140, a data storage unit 142 and a wireless communication unit 144 near a top edge of the hemispherical lower portion 124 of the spherical sensor unit 120; attaching a plurality of sensors into a hemispherical upper portion 122 of the spherical sensor unit 120; connecting the hemispherical upper portion 122 of the spherical sensor unit 120 to the hemispherical lower portion 124 by a band 126 which surrounds a lower edge of the hemispherical upper portion 122 and an upper edge of the hemispherical lower portion 124; inserting a spherical sensor unit holder 146 into a cutout in the rhombohedral body 110; inserting the spherical sensor unit 120 into the spherical sensor unit holder 146; locking, by a spherical sensor unit lock 148 connected to the spherical sensor unit holder 146, the spherical sensor unit 120 into the rhombohedral body 110; positioning the modular pipe inspection robot 100 on the external surface of the pipe; securing the robot 100 to the pipe by engaging a plurality of magnet wheels 160 of the modular pipe inspection robot 100 with the external surface; generating, by a microcontroller 140 located within the spherical sensor unit 120, a plurality of drive signals configured to actuate a plurality of geared motors 162, wherein each of the plurality of geared motors 162 is connected to an axle shaft 164 of a respective magnet wheel 160; actuating, by the drive signals, the plurality of geared motors 162 to rotate the plurality of magnet wheels 160 and navigate along the external surface; actuating, by the microcontroller 140, the plurality of sensors to perform measurements and generate measurements; collecting, by the data storage unit 142, the sensor measurement signals from the plurality of sensors while navigating along the external surface; storing the sensor measurement signals in the data storage unit 142; transmitting, by a wireless communication unit 144 operatively connected to the microcontroller 140, the sensor measurement signals collected by the data storage unit 142 to an external receiver; and dissipating heat generated during operation through a plurality of cooling fins 182 integrated into the rhombohedral body 110.

In an aspect, the method 700, further comprises: receiving, by the data storage unit 142: humidity measurement signals generated by a humidity sensor 130, temperature measurement signals of an ambient temperature surrounding the modular pipe inspection robot 100, generated by a temperature sensor 132, distance measurement signals generated by a first ultrasonic sensor 134, distance measurement signals generated by a second ultrasonic sensor 136, and a temperature of the external surface of the pipe generated by an infrared sensor 138.

In an aspect, the method 700, further comprises: lowering, by servo motor control signals generated by the microcontroller 140, a servo motor-controlled arm 190 located on an outer surface of the rhombohedral body 110; measuring, by a thickness gauge 192 located on a distal end of the servo motor-controlled arm 190, a thickness of a wall of the pipe; and receiving, by the microcontroller 140, a thickness measurement signal of the thickness of the wall of the pipe; storing, in the data storage unit 142, the thickness measurement signal; and transmitting, by the wireless communications unit 144, the thickness measurement signal with the sensor measurement signals to the external receiver.

Figure 8:
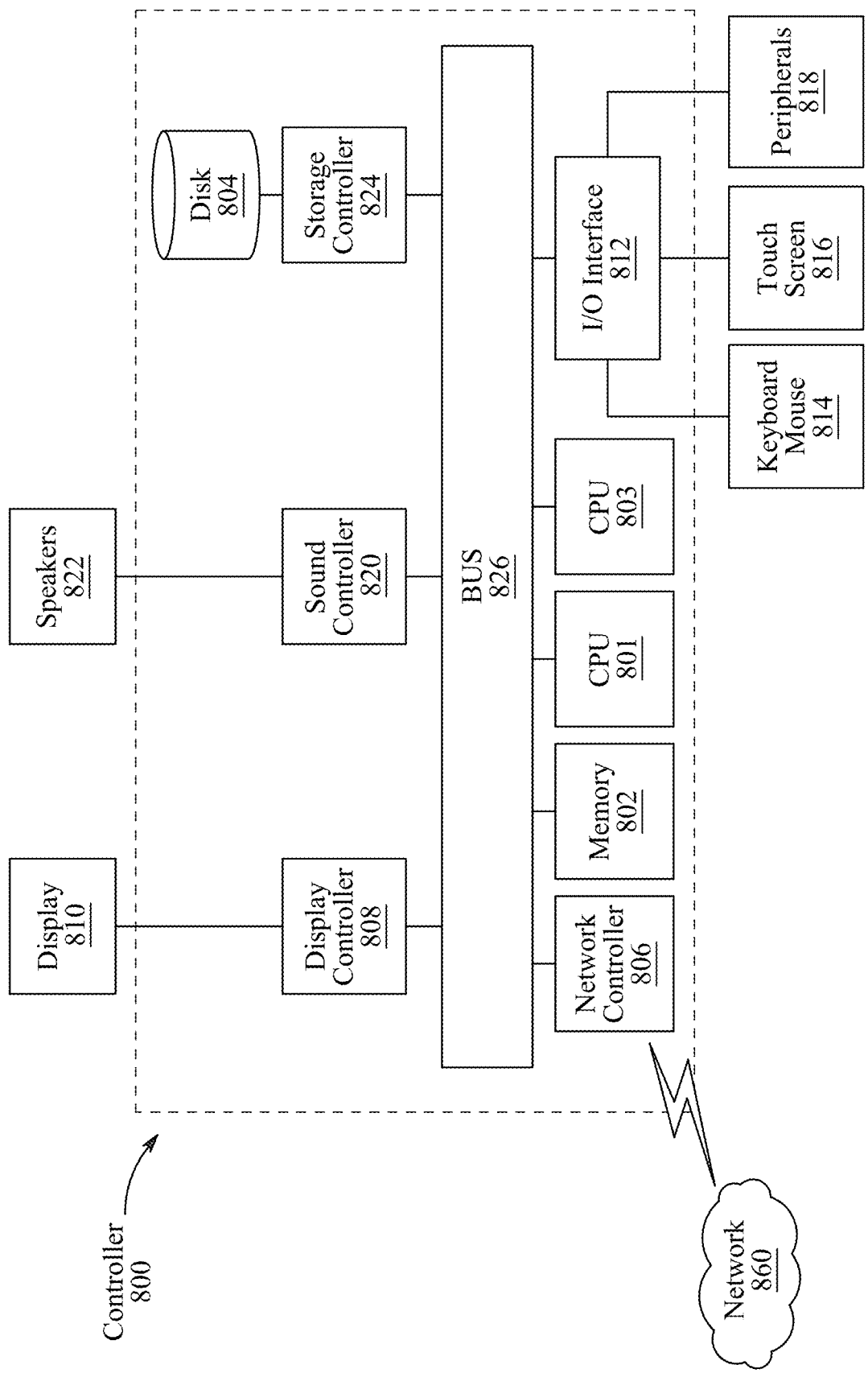
FIG. 8 is an illustration of a non-limiting example of details of computing hardware used in the computing system, according to certain embodiments.

Next, further details of the hardware description of the computing environment according to exemplary embodiments is described with reference to FIG. 8. In FIG. 8, a controller 800 is described embodying the microcontroller 140 of the modular pipe inspection robot 100 of the present disclosure, in which the controller is a computing device which includes a CPU 801 which performs the processes described above/below. The process data and instructions may be stored in memory 802. These processes and instructions may also be stored on a storage medium disk 804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 7, Microsoft Windows 8, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of ordinary skill in the art would recognize. Further, CPU 801, 803 may be implemented as multiple processors cooperatively working in parallel to perform the instructions of the inventive processes described above.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN sub-networks. The network 860 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
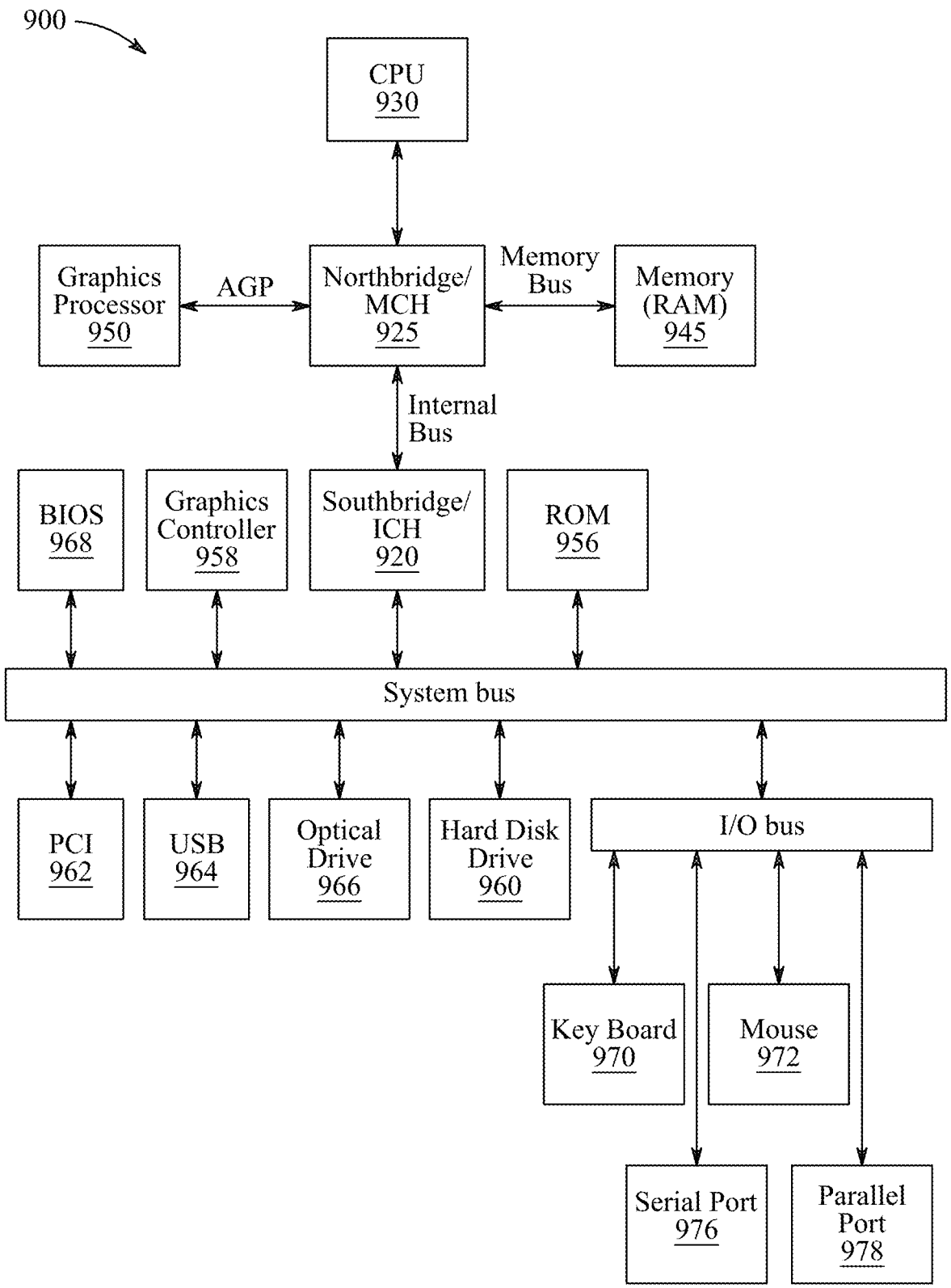
FIG. 9 is an exemplary schematic diagram of a data processing system used within the computing system, according to certain embodiments.

FIG. 9 shows a schematic diagram of a data processing system, according to certain embodiments, for performing the functions of the exemplary embodiments. The data processing system is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
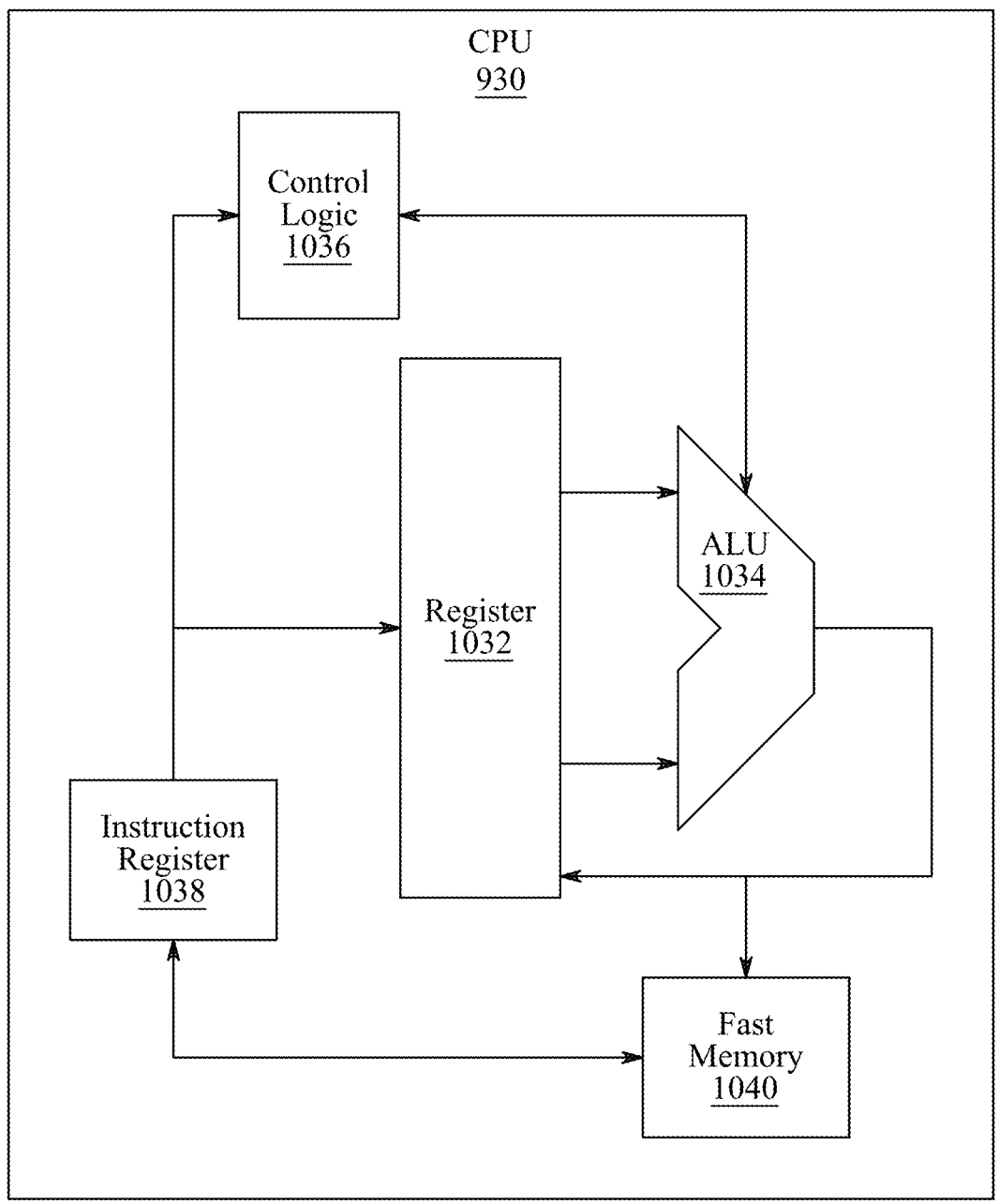
FIG. 10 is an exemplary schematic diagram of a processor used with the computing system, according to certain embodiments.

For example, FIG. 10 shows one implementation of CPU 930. In one implementation, the instruction register 1038 retrieves instructions from the fast memory 1040. At least part of these instructions are fetched from the instruction register 1038 by the control logic 1036 and interpreted according to the instruction set architecture of the CPU 930. Part of the instructions can also be directed to the register 1032. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 930 can use a reduced instruction set architecture, a complex instruction set architecture, a vector processor architecture, a very large instruction word architecture. Furthermore, the CPU 930 can be based on the Von Neuman model or the Harvard model. The CPU 930 can be a digital signal processor, an FPGA, an ASIC, a PLA, a PLD, or a CPLD. Further, the CPU 930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 988 through a PCI bus 962.

The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 11:
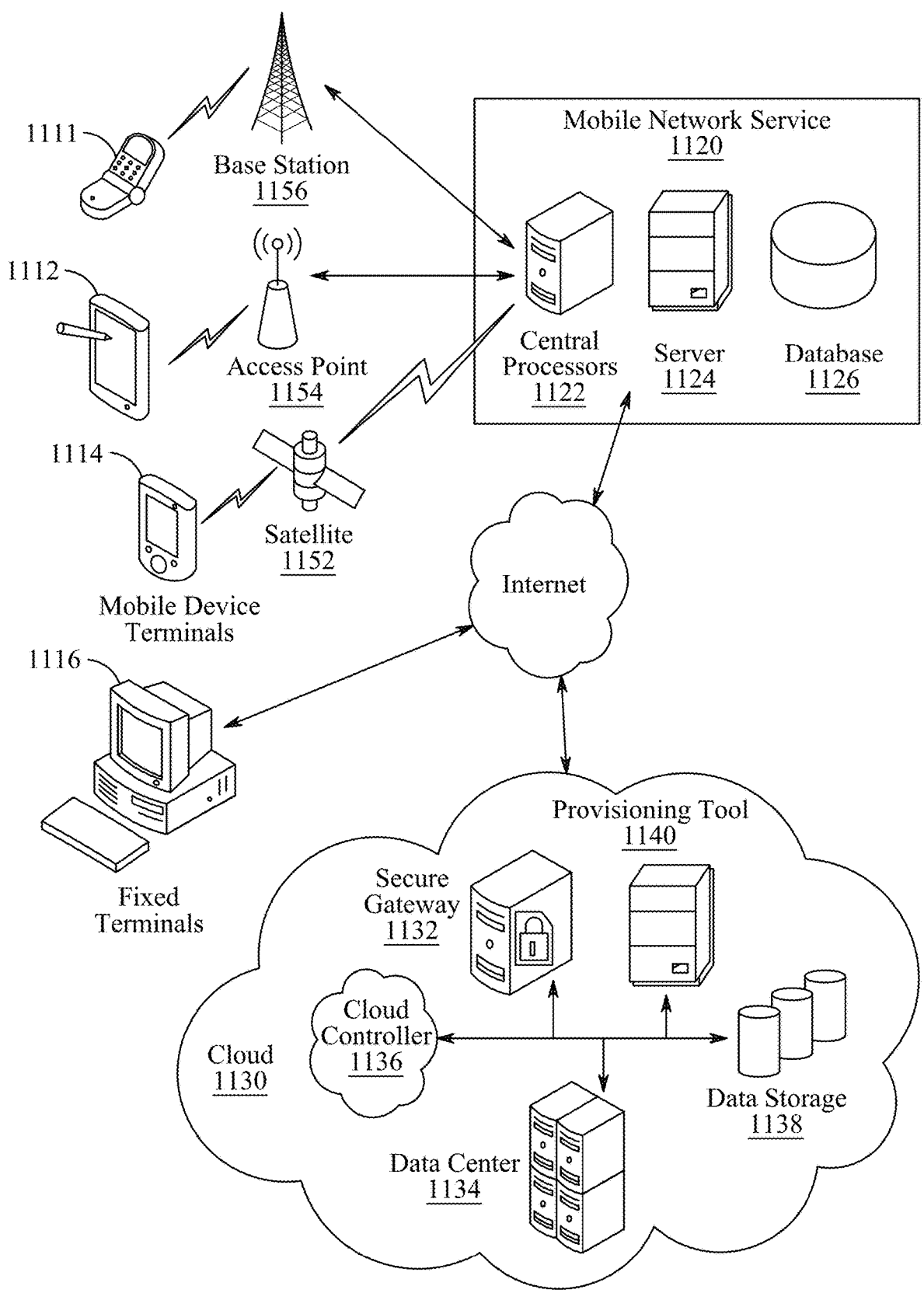
FIG. 11 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1130 including a cloud controller 1136, a secure gateway 1132, a data center 1134, data storage 1138 and a provisioning tool 1140, and mobile network services 1120 including central processors 1122, a server 1124 and a database 1126, which may share processing, as shown by FIG. 11, in addition to various human interface and communication devices (e.g., display monitors 1116, smart phones 1110, tablets 1112, personal digital assistants (PDAs) 1114). The network may be a private network, such as a LAN, satellite 1152 or WAN 1154, or be a public network, may such as the Internet. Input to the system may be received via direct user input and received remotely in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A modular pipe inspection robot for operation on an external surface of a pipe, comprising:
   a spherical sensor unit having a hemispherical upper portion and a hemispherical lower portion;
   a rhombohedral body including a first side, a second side opposite the first side, a rear end, a front end, wheel well cutouts on the first side and the second side and an angled top surface equipped with a hemispherical opening configured to support the spherical sensor unit;
   a plurality of magnet wheels located beneath the rhombohedral body;
   a plurality of geared motors configured to rotate the plurality of magnetic wheels;
   a power supply located in the hemispherical lower portion;
   a plurality of sensors mounted within the spherical sensor unit;
   a microcontroller positioned within the spherical sensor unit, wherein the microcontroller is operatively connected to the plurality of geared motors, the power supply and the plurality of sensors; and
   a thermal management system comprising a plurality of cooling fins integrated into the rhombohedral body.

2. The modular pipe inspection robot of claim 1, wherein the plurality of cooling fins are arranged on the rhombohedral body on any of the first side, the second side opposite the first side, the rear end and a lower surface.

3. The modular pipe inspection robot of claim 1, further comprising:
   a data storage unit operatively connected to the microcontroller, wherein each of the plurality of sensors is configured to measure at least one physical property of the external surface of the pipe and transmit a measurement signal to the data storage unit, wherein the data storage unit is configured to store the measurement signals; and
   a wireless communication unit operatively connected to the microcontroller, wherein the wireless communication unit is configured to transmit the measurement signals.

4. The modular pipe inspection robot of claim 3, wherein the plurality of sensors comprises:
   a humidity sensor;
   a temperature sensor;
   a first ultrasonic sensor;
   a second ultrasonic sensor, and
   an infrared (IR) temperature sensor.

5. The modular pipe inspection robot of claim 4, further comprising:
   a band configured to join the hemispherical upper portion and the hemispherical lower portion of the spherical sensor unit, wherein the band is further configured to hold the IR temperature sensor.

6. The modular pipe inspection robot of claim 4, further comprising:
   a first cutout located in the hemispherical upper portion near the front end, wherein the first cutout is configured to hold the first ultrasonic sensor; and
   a second cutout located in the hemispherical upper portion adjacent the first cutout, wherein the second cutout is configured to hold the second ultrasonic sensor, wherein the first ultrasonic sensor and the second ultrasonic sensor are configured to measure a distance along the pipe and transmit a distance signal to the data storage unit.

7. The modular pipe inspection robot of claim 6, further comprising:
   a servo motor-controlled arm located on an outer surface of the rhombohedral body; and
   a thickness gauge located on a distal end of the servo motor-controlled arm, wherein the thickness gauge is configured to measure a thickness of a wall of the pipe, wherein the microcontroller is configured to actuate the servo motor-controlled arm and the data storage unit is configured to receive a measurement of the thickness of the wall of the pipe.

8. The modular pipe inspection robot of claim 7, further comprising:
   a circuit board located between the hemispherical upper portion and the hemispherical lower portion of the spherical sensor unit, wherein the circuit board is configured to hold the microcontroller, the data storage unit, the wireless communication unit and provide connections between the microcontroller and the power supply, the data storage unit, the wireless communication unit, the plurality of geared motors, the plurality of sensors and the servo-controlled arm.

9. The modular pipe inspection robot of claim 1, wherein the rhombohedral lower portion is a 3D-printed aluminum chassis.

10. The modular pipe inspection robot of claim 1, wherein the hemispherical upper portion and the hemispherical lower portion of the spherical sensor unit are a 3D printed plastic material.

11. The modular pipe inspection robot of claim 1, wherein the cooling fins are arranged in a pattern selected from one of a radial pattern, a longitudinal pattern and a combination of the radial pattern and the longitudinal pattern.

12. The modular pipe inspection robot of claim 1, wherein the plurality of magnet wheels each comprise a plurality of alternating pole magnets, wherein the alternating pole magnets are selected from the group comprising a plurality of permanent magnets and a plurality of electromagnets.

13. The modular pipe inspection robot of claim 12, wherein each one of the plurality of geared motors is connected to an axle shaft which extends through one of the plurality of magnet wheels.

14. The modular pipe inspection robot of claim 13, further comprising:
a geared motor driver connected to the hemispherical lower portion of the spherical sensor unit, wherein the geared motor driver is connected to the microcontroller and to the plurality of geared motors, wherein the microcontroller is configured to generate drive signals to actuate the plurality of geared motors to rotate the plurality of magnet wheels and drive the modular pipe inspection robot along the external surface of the pipe.

15. The modular pipe inspection robot of claim 1, further comprising:
a frame unit configured to surround the rhombohedral body at a location on a lower edge of the rhombohedral body, wherein the frame unit comprises straight portions configured to edge the front end and the rear end and body fender portions configured to edge the wheel wells.

16. The modular pipe inspection robot of claim 1, further comprising:
a spherical sensor unit holder; and
a spherical sensor unit lock connected to the spherical sensor unit holder, wherein the spherical sensor unit holder is configured to secure the spherical sensor unit within the rhombohedral body.

17. The modular pipe inspection robot of claim 1, further comprising:
a charge adapter unit including a power port, wherein the charge adapter unit is configured to insert into a cutout in the rear end of the rhombohedral body,
wherein the power supply includes a rechargeable battery, and
wherein the charge adapter unit includes power receptacles configured to connect to a power source to recharge the rechargeable battery of the power supply.

18. A method for inspecting an external surface of a pipe with a modular pipe inspection robot, comprising:
inserting a power supply into a hemispherical lower portion of a spherical sensor unit;
inserting a circuit board including a microcontroller, a data storage unit and a wireless communication unit near a top edge of the hemispherical lower portion of the spherical sensor unit;
attaching a plurality of sensors into a hemispherical upper portion of the spherical sensor unit;
connecting the hemispherical upper portion of the spherical sensor unit to the hemispherical lower portion by a band which surrounds a lower edge of the hemispherical upper portion and an upper edge of the hemispherical lower portion;
inserting a spherical sensor unit holder into a cutout in the rhombohedral body;
inserting the spherical sensor unit into the spherical sensor unit holder;
locking, by a spherical sensor unit lock connected to the spherical sensor unit holder, the spherical sensor unit into the rhombohedral body;
positioning the modular pipe inspection robot on the external surface of the pipe;
securing the robot to the pipe by engaging a plurality of magnet wheels of the modular pipe inspection robot with the external surface;
generating, by a microcontroller located within the spherical sensor unit, a plurality of drive signals configured to actuate a plurality of geared motors, wherein each of the plurality of geared motors is connected to an axle of a respective magnet wheel;
actuating, by the drive signals, the plurality of geared motors to rotate the plurality of magnet wheels and navigate along the external surface;
actuating, by the microcontroller, the plurality of sensors to perform measurements and generate measurements;
collecting, by the data storage unit, the sensor measurement signals from the plurality of sensors while navigating along the external surface;
storing the sensor measurement signals in the data storage unit;
transmitting, by a wireless communication unit operatively connected to the microcontroller, the sensor measurement signals collected by the data storage unit to an external receiver; and
dissipating heat generated during operation through a plurality of cooling fins integrated into the rhombohedral body.

19. The method of claim 18, further comprising receiving, by the data storage unit:
humidity measurement signals generated by a humidity sensor,
temperature measurement signals of an ambient temperature surrounding the modular pipe inspection robot, generated by a temperature sensor,
distance measurement signals generated by a first ultrasonic sensor,
distance measurement signals generated by a second ultrasonic sensor, and
a temperature of the external surface of the pipe generated by an infrared sensor.

20. The method of claim 19, further comprising:
lowering, by servo motor control signals generated by the microcontroller, a servo motor-controlled arm located on an outer surface of the rhombohedral body;
measuring, by a thickness gauge located on a distal end of the servo motor-controlled arm, a thickness of a wall of the pipe; and
receiving, by the microcontroller, a thickness measurement signal of the thickness of the wall of the pipe;
storing, in the data storage unit, the thickness measurement signal; and
transmitting, by the wireless communications unit, the thickness measurement signal with the sensor measurement signals to the external receiver.

* * * * *